(12) United States Patent
Khabazian

(10) Patent No.: US 10,832,262 B2
(45) Date of Patent: Nov. 10, 2020

(54) MODELING CONSUMER ACTIVITY

(71) Applicant: Mohammad Iman Khabazian, Santa Clara, CA (US)

(72) Inventor: Mohammad Iman Khabazian, Santa Clara, CA (US)

( * ) Notice: Subject to any disclaimer, the term of this patent is extended or adjusted under 35 U.S.C. 154(b) by 335 days.

(21) Appl. No.: 15/922,652

(22) Filed: Mar. 15, 2018

(65) Prior Publication Data

US 2018/0240136 A1    Aug. 23, 2018

Related U.S. Application Data

(63) Continuation of application No. 14/694,771, filed on Apr. 23, 2015, now abandoned.

(60) Provisional application No. 61/984,370, filed on Apr. 25, 2014.

(51) Int. Cl.
| | | |
|---|---|---|
| *G06Q 30/02* | (2012.01) | |
| *G06N 20/00* | (2019.01) | |
| *G06Q 10/00* | (2012.01) | |

(52) U.S. Cl.
CPC ......... *G06Q 30/0201* (2013.01); *G06N 20/00* (2019.01)

(58) Field of Classification Search
CPC ............................ G06Q 30/0201; G06N 20/00
USPC ....................................................... 705/7.35
See application file for complete search history.

(56) References Cited

U.S. PATENT DOCUMENTS

| | | | | |
|---|---|---|---|---|
| 7,729,940 B2* | 6/2010 | Harvey | ............. | G06Q 10/0639 705/7.31 |
| 8,473,328 B2* | 6/2013 | Lawton | ................ | G06Q 10/063 705/7.33 |
| 9,015,093 B1* | 4/2015 | Commons | ............. | B60W 30/00 706/26 |
| 2004/0143485 A1* | 7/2004 | Naples | ............. | G06Q 10/06375 705/7.37 |
| 2007/0094066 A1* | 4/2007 | Kumar | ................... | G06Q 30/06 706/61 |
| 2007/0157229 A1* | 7/2007 | Heathcock | ............. | G06Q 30/02 725/34 |
| 2008/0154705 A1* | 6/2008 | Gounares | ........... | G06Q 30/0206 705/80 |
| 2008/0305869 A1* | 12/2008 | Konforty | ............ | G07F 17/3276 463/29 |

(Continued)

OTHER PUBLICATIONS

Chen Li-gang Li Yi-jun Allocating Budget across Portals in Search Engine Advertising 2009 International Conference on Management Science & Engineering (16th), Sep. 14-16, 2009 Moscow, Russia (Year: 2009).*

(Continued)

*Primary Examiner* — Rutao Wu
*Assistant Examiner* — Abdallah A El-Hage Hassan
(74) *Attorney, Agent, or Firm* — Kunzler Bean & Adamson

(57) ABSTRACT

For modeling consumer activity, a plurality of processor computational resources generates potential model types. In addition, the plurality of processor computational resources divides activity data into a training data set, a test data set, and a validation data set. The plurality of processor computational resources further trains the potential model types with the training set data. In addition, the plurality of processor computational resources selects a model type with the test data set. The plurality of processor computational resources calculates algorithmic parameters with the validation data set.

20 Claims, 21 Drawing Sheets

(56) References Cited

U.S. PATENT DOCUMENTS

| | | | | |
|---|---|---|---|---|
| 2008/0312979 | A1* | 12/2008 | Lee .................. | G06Q 10/06375 705/7.28 |
| 2011/0251874 | A1* | 10/2011 | Banthia .................. | G06Q 30/02 705/7.31 |
| 2012/0254333 | A1* | 10/2012 | Chandramouli ..... | G06Q 10/107 709/206 |
| 2013/0262352 | A1* | 10/2013 | Sung .................. | G06K 9/00342 706/12 |
| 2013/0290339 | A1* | 10/2013 | LuVogt .................. | G06Q 10/10 707/740 |
| 2014/0067460 | A1* | 3/2014 | Atacik ............... | G06Q 30/0242 705/7.28 |
| 2014/0073420 | A1* | 3/2014 | Matthew ................. | A63F 13/79 463/29 |
| 2015/0046251 | A1* | 2/2015 | Smith ............... | G06Q 30/0242 705/14.41 |
| 2015/0100415 | A1* | 4/2015 | Yu ..................... | G06Q 30/0251 705/14.49 |

OTHER PUBLICATIONS

Shruti Kohli, Birla Institute of Technology, Mesra; Dr. Ela Kumar, YMCA Institute of Engineering Evolution of Interdependency Model based on Behavioral Analysis of User, Search Engine and Advertiser in Online Advertising IEEE 2008 (Year: 2008).*

Enrique Frias-Martinez, Sherry Y. Chen, and Xiaohui Liu Survey of Data Mining Approaches to User Modeling for Adaptive Hypermedia IEEE, Applications and Reviews, vol. 36, No. 6, Nov. 2006 (Year: 2006).*

* cited by examiner

423

*{"group_names":
["error.client.main55=occurred","abtest.prices=cheap", "abtest.prices=expensive",
"gender=f","gender=m","ad=FB1.1.15",”ad=FB2.2.15","installdate=2.2.15","inst
alldate=2.3.15"], "interval":"5m",""start time":"1398287554",
"time_series":
[[1,0,0,-33,-69,380,26,-7,970,-16,3,265,-2,-17,742,-2,0,868,20,21,414,45,-
12,694,43,12,649,-6,-20,367],[2,0,0,-4,-3,651,-2,9,354,-1,8,469,2,0,204,-65,21,686,-
3,14,616,0,-24,695,56,-9,768,-48,42,576],[3,0,0,-16,-16,601,-5,7,414,-17,3,691,16,-
34,793,-24,28,428,-2,53,449,22,56,205,-51,-47,425,-6,15,690]*

{"groups":[
"AdCampaign=FB.1/1/2015", "AdCampaign=FB.2/2/2015",
"Error.Client.NullReference.Main.Line223=occurred", "Funnel.Tutorial=Started"],
"timeseries":[
"1398290987": "0,0,1,0,0,0",
"1398291287": "5,8,1,0,0,1"], "groups":[
"AdCampaign=FB.1/1/2015", "AdCampaign=FB.2/2/2015",
"Error.Client.NullReference.Main.Line223=occurred",
"Funnel.Tutorial=Started","Funnel.Tutorial=Completed","UI.MainMenuClicked=occurred], "timeseries":[
"1398291587": "5,13,1,0,0,1,1,1",
"1398291887": "6,14,1,0,0,1,1,1",
"1398292187": "5,17,1,0,1,1,1,1"]
}

```
{
...
"groups": "AdCampaign=FB.1/1/2015, AdCampaign=FB.2/2/2015,
Error.Client.NullReference.Main.Line223=occurred, Funnel.Tutorial=Started", "timeseries" : {
...
"1398290987": "65,21,67,3,-23,57,87,-24,67,97,23,-56,22,46,-8,-1,2,34,-23,2,-13,43,..."
"1398291287":"65,21,67,3,-23,57,87,-24,67,97,23,-56,22,46,-8,-1,2,34,-23,2,-13,43,..."
"1398291887":"65,21,67,3,-23,57,87,-24,67,97,23,-56,22,46,-8,-1,2,34,-23,2,-13,43,..."
"1398292187":"65,21,67,3,-23,57,87,-24,67,97,23,-56,22,46,-8,-1,2,34,-23,2,-13,43,..."
...
}
}
```

240

| Algorithmic Parameters 227 |
| Income Learning Weight Vector 241 |
| Cost Learning Weight Vector 243 |
| Lifetime Value Model 245 |
| Cost Per Install Model 247 |
| Return on Investment 249 |

```
Iterate through all model types, mt {
    iterate through all algorithmic parameters, ap {
        Find weights given ap, mt against validation data set
        Find cost, C1 of those weights against test data set
    }
    select ap with least cost C1
    Find weights for ap, mt against test and validation data set
    Find cost, C2 against train set
}
select mt (and associated ap) with least cost C2
Find weights against all available data sets
```

FIG. 16

MODELING CONSUMER ACTIVITY

CROSS-REFERENCE TO RELATED APPLICATIONS

This application is a continuation-in-part application of U.S. patent application Ser. No. 14/694,771 entitled "MODELING CONSUMER ACTIVITY" and filed on Apr. 23, 2015 for Mohammad Iman Khabazian, which is incorporated herein by reference, and which claims priority to U.S. Provisional Patent Application No. 61/984,370 entitled "ROI PREDICTION FOR SOFTWARE PRODUCT" and filed on Apr. 25, 2014 for Mohammad Iman Khabazian, which is incorporated herein by reference.

FIELD

The subject matter disclosed herein relates to consumer activity and more particularly relates to modeling consumer activity.

BACKGROUND

Description of the Related Art

Businesses must invest in marketing, promotional, and other activities to acquire customers, yet predicting the return on this investment is often computationally intractable.

BRIEF SUMMARY

A method for modeling consumer activity is disclosed. A plurality of processor computational resources generates potential model types. In addition, the plurality of processor computational resources divides activity data into a training data set, a test data set, and a validation data set. The plurality of processor computational resources further trains the potential model types with the training set data. In addition, the plurality of processor computational resources selects a model type with the test data set. The plurality of processor computational resources calculates algorithmic parameters with the validation data set. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9A is a text drawing illustrating one embodiment of returned data;

FIG. 9B is a text drawing illustrating one embodiment of a user activity document;

FIG. 10 is a text drawing illustrating one embodiment of an analytics database;

FIG. 13E is a schematic block diagram illustrating one embodiment of a consumer activity model;

FIG. 16 is a text illustration showing one embodiment of pseudocode for the consumer activity modeling method.

DETAILED DESCRIPTION

Figure 1:
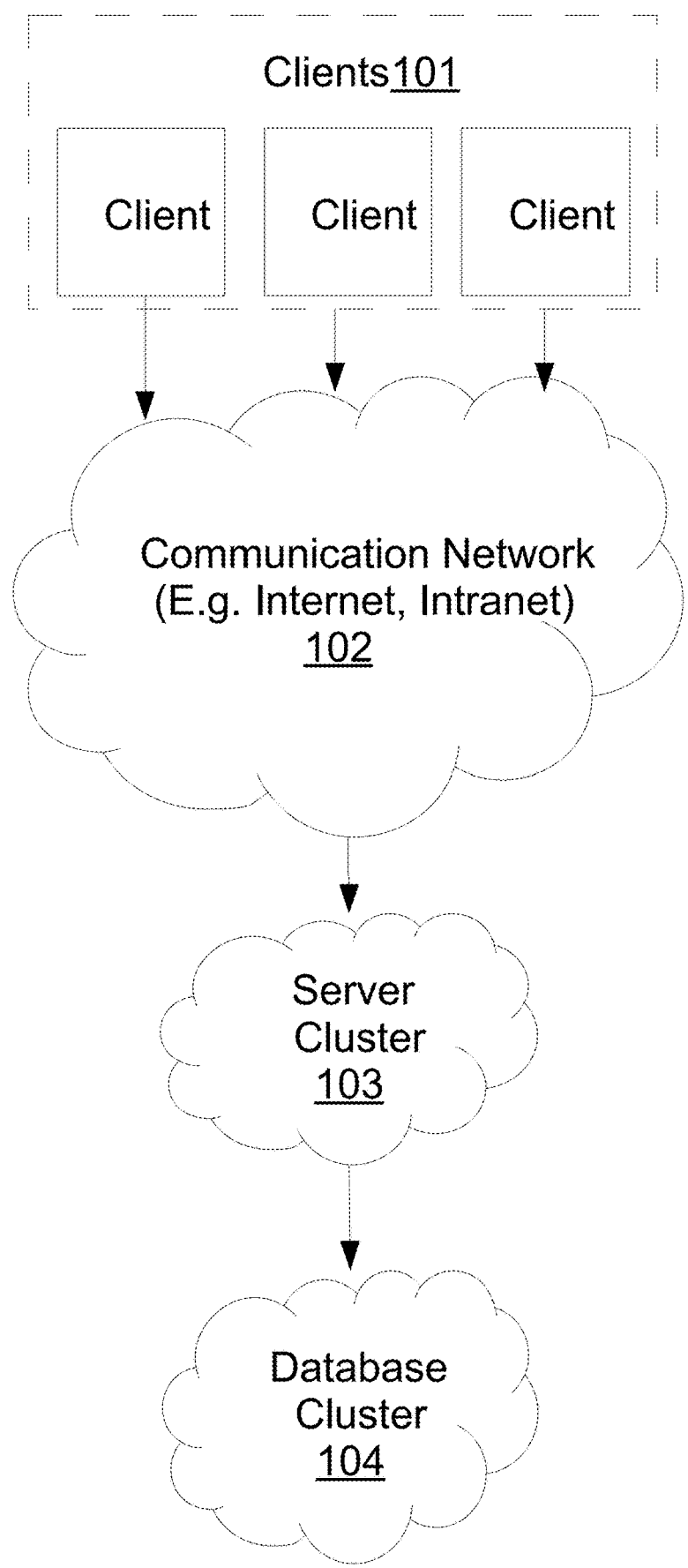
FIG. 1 is a schematic block diagram illustrating one embodiment of systems that support consumer activity.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The following are novel features of the embodiments.

The assembly of an assortment of novel art as well as prior art into particular modules and layers and the particular assortment of these modules and layers to create a complete solution that predicts the financial performance of a product and further correlates that performance to dynamic groupings or events from user activity.

The assembly of an assortment of novel art as well as prior art that determines a user's life time value (LTV) and user acquisition cost, also referred to as cost per install (CPI).

The assembly of an assortment of novel art as well as prior art that uses learning techniques to correlate the consumers' classifications to business metrics values.

A method for learning CPI by predicting the amount of users an Ad Campaign will generate at a particular time/date where a sample is created for every previous install amount at every previous timeframe, and from that sample we can use one or more of these inputs into a learning algorithm:

An expected amount of users from an advertisement.
A binary value for every possible ad advertising campaign indicating the source campaign
Time since beginning of advertising campaign A method for learning LTV by predicting the amount of each user will spend at a particular time/date where a sample is created for every previous install amount at every previous timeframe, and from that sample we can use one or more of these inputs into a learning algorithm:

Every burn value (e.g. money spent, time spent)
time since install
group memberships A method for recommending interesting data to look at based on learned correlation models between groups and metrics (e.g. LTV).

A method for estimating a groups contribution to other metrics (in the below example those metrics are LTV and CPI predictions) based on the learned correlation model between groupings and that metric.

A method for describing the contribution of groups (or consumer classifications) to a metric by using the learned weights.

A method to make time based predictions by creating separate rows for every past passage of time (at some interval) leading up to the known output in the present.

A method for understanding the total impact of a prediction over a life cycle, by making that prediction time based, then using the "last day" of the life cycle in the time input of the model.

A method of incorporating performance from other products into learning a prediction model for a given product.

A method for using previous learned weights adjusted for the passage of time, instead of samples from that time, along with inputs from changes, to fully predict a time dependent output.

A method from incorporating separating learning silos together efficiently by using the weights learned by those silos.

A method for efficiently including learning from all other products into the learning inputs for any given product.

Using these methods, the embodiments may enable benchmarking of a products' financial performance in regards to the cost of acquiring a user and the life time value of a user. The embodiments may correlate these metrics to groupings or events based on user activity and simulate the financial impact of tuning the product by investing in some groups and divesting in others.

Physical Deployment

Figure 2:
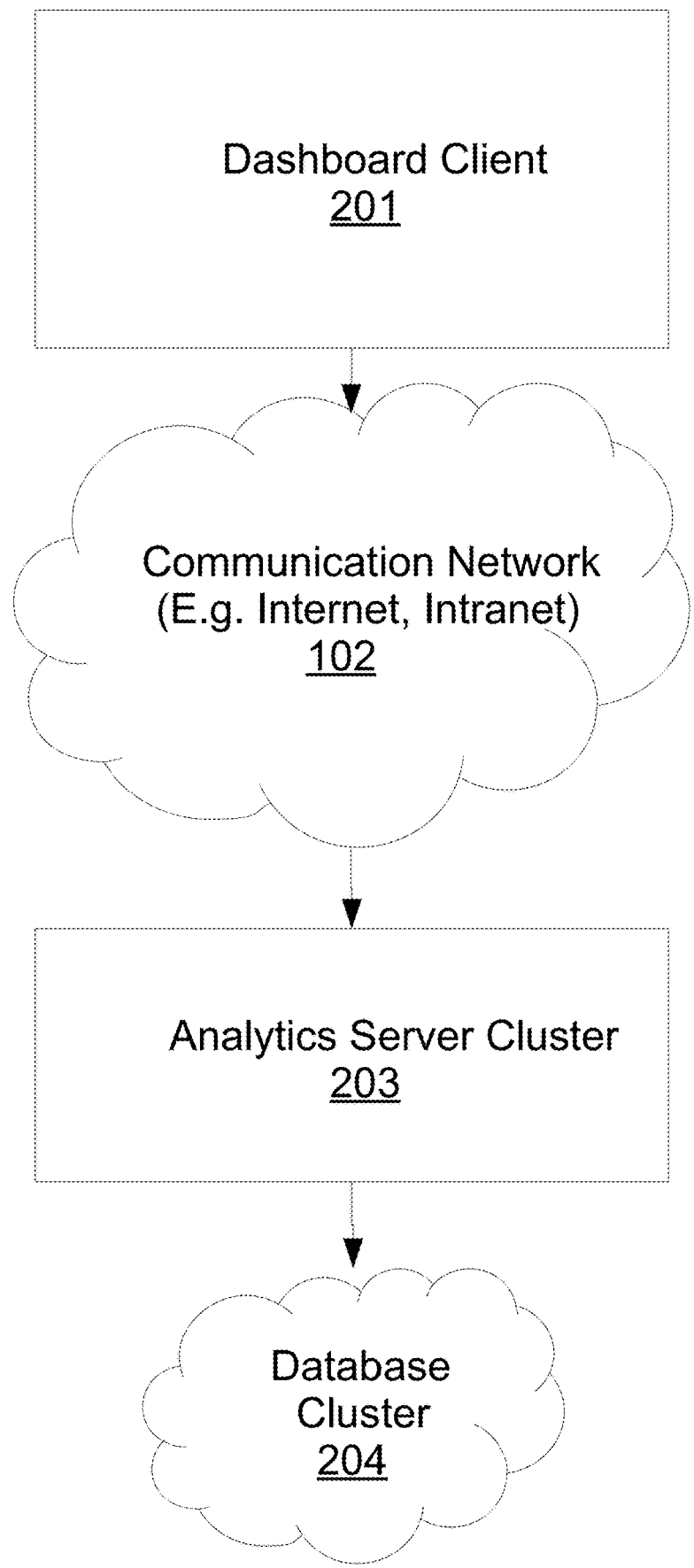
FIG. 2 is a schematic block diagram illustrating one embodiment of a system that supports an analytics dashboard.

FIG. 1 describes a possible topology for deployment supporting consumer interactions with a product while FIG. 2 describes a possible topology for deployment supporting administrative interactions. The embodiments may also be practiced with other products. The product may be a software product such as an online game.

Clients 101 refer to software that runs on the consumer's (i.e. end user's) computer (e.g. desktop, laptop, mobile, or any device that can run the client software). Clients 101 will send data and request data to the server through the internet or some network protocol. The dashboard client 201 is the dashboard client software which runs on the computer belonging to the user of the Dashboard, usually an employee of the company that builds the product being measured.

The communication network 102 represents the public internet, private intranet, or other communication network. A consumer server cluster 103 is software that runs on the server that supports the consumer data flow. The consumer server cluster 103 may store data on the database cluster 104. An analytics server cluster 203 is software that runs on the server that supports the dashboard data flow. The analytics server cluster 203 may store data in the database cluster 204. Server clusters 103 and 203 might physically be a single physical node, a group of physical nodes, a virtual node, a group of virtual nodes, or any device that can run the server software. The server software will handle requests from the client, run the logic described in the embodiments described herein, and use the database to store data. The database cluster 104 and 204 are physical nodes, group of physical nodes, virtual nodes, or group of virtual nodes able to store data and retrieve stored data.

Dashboard Panel

Figure 4:
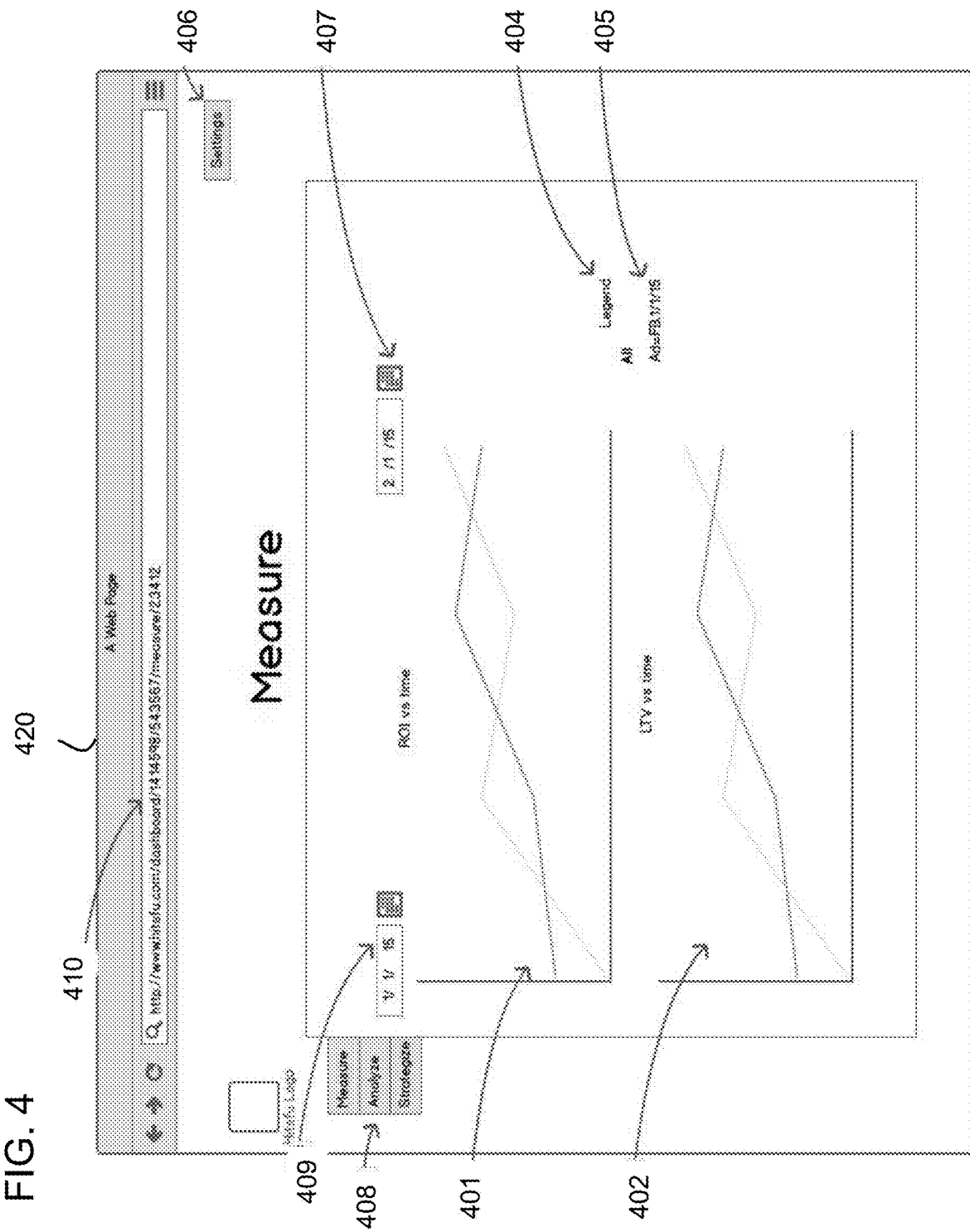
FIG. 4 is a drawing illustrating one embodiment of a user interface for a "Measure" dashboard.
Figure 5:
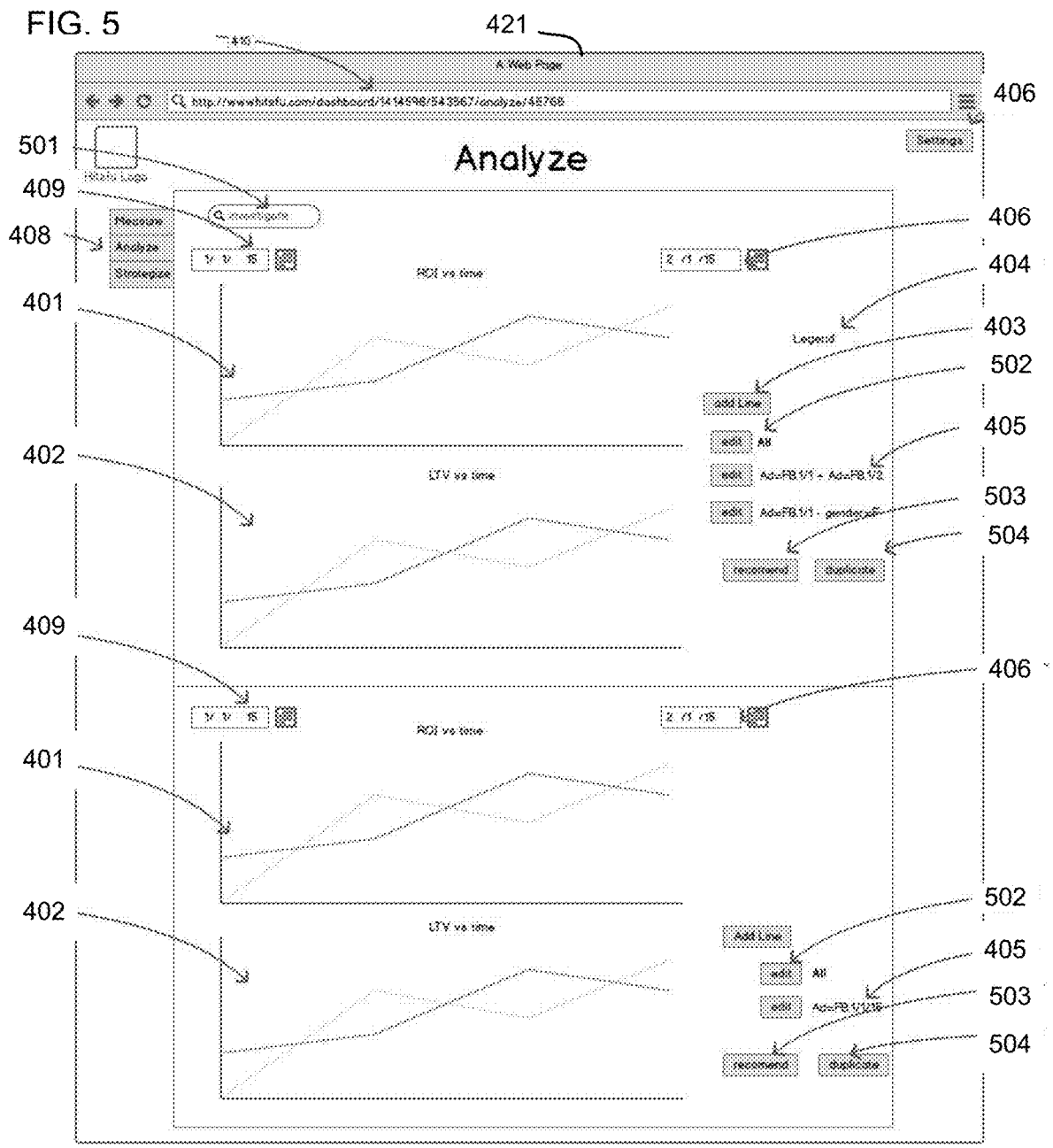
FIG. 5 is a drawing illustrating one embodiment of a user interface for a "Analyze" dashboard.
Figure 6:
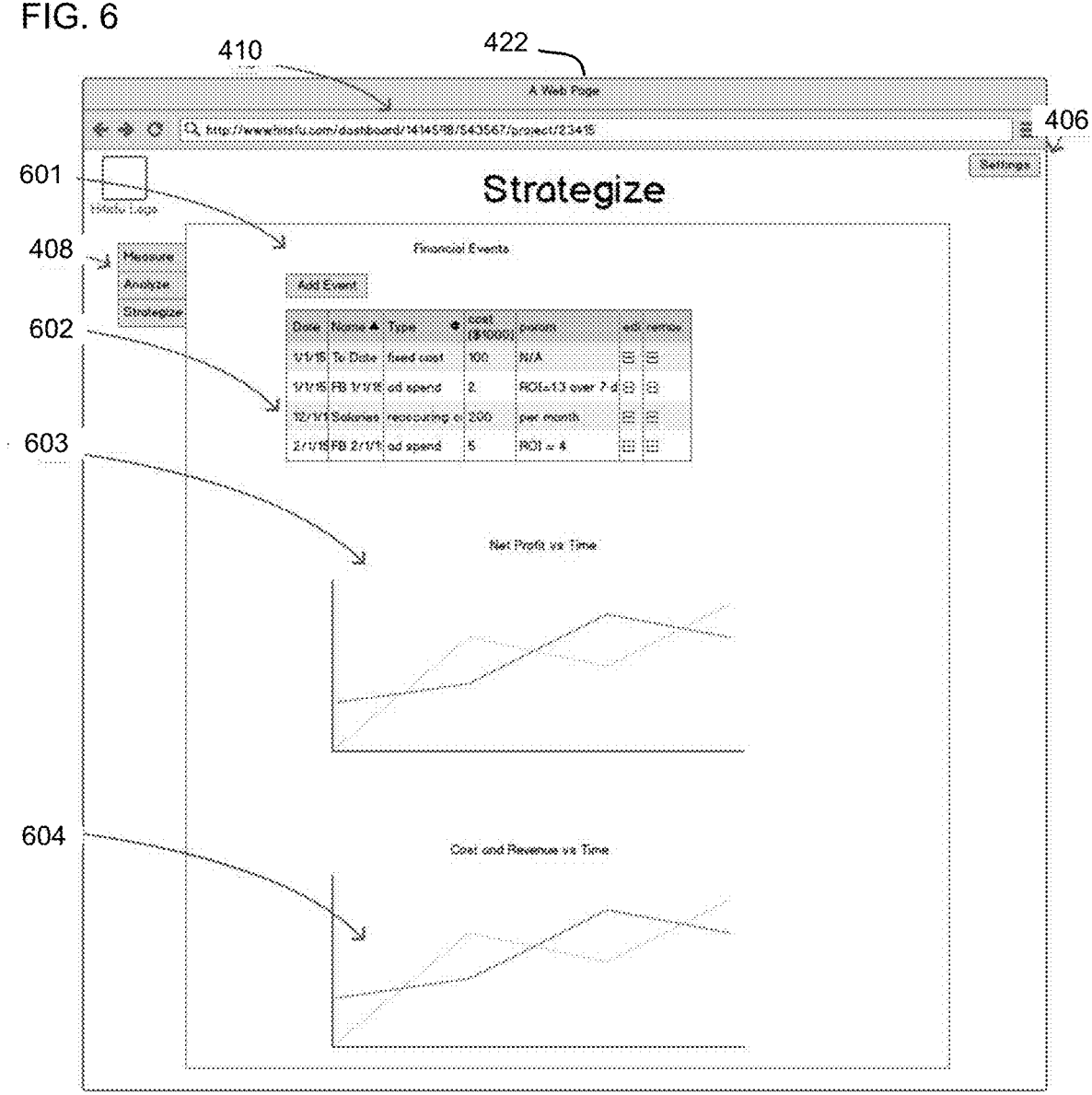
FIG. 6 is a drawing illustrating one embodiment of a user interface for a "Strategize" dashboard.

The dashboard allows product administrators to measure, analyze, and strategize based on predicted return on investment (ROI). The dashboard consists of three screens, "Measure" as illustrated by FIG. 4, "Analyze" as illustrated by FIG. 5 and Strategize as illustrated by FIG. 6. A user interface (UI) element 408 allows navigation between the screens.

Dashboard Panel—Measure

In FIG. 4, the Measure screen 420 may provide an overview of how the product (which is subject to the measurement) is behaving. Tickers are graphs where the x-axis indicates time. We use two tickers. Ticker 401 illustrates ROI (return on investment) on the Y-axis and ticker 402 illustrates LTV (Life time value) on the Y-axis. Multiple color-coded curves will be drawn on both. Those curves represent the inclusion and exclusion of certain groups defined by a line query that is listed under Legend 404. UI element 405 is an example of a line query that includes the group "Ad=FB.1/1/15". Line queries are explained in more detail hereafter. Line queries for "Measure" include "All" (all groups included), as well as whichever groups have the biggest LTV contribution change over time range.

By default the tickers in the Measure screen 420 will use a start date and time that is directly after the last time the dashboard user looked at the Measure screen 420 and an end date and time equal to the current date and time when the dashboard user is looking at the Measure screen 420.

The curve for line query takes on the ROI ticker is calculated by dividing LTV by CPI at every time frame. The time period for these graphs is between a start date, selected by Start Date Picker 409 and an end date selected by End Date Picker 407 or other controls that allow choosing a date range. Settings 406 loads a screen where settings and configurations can be managed. One such configuration is for a setting called "last day" which should be set to the when the app maker thinks the product will be shut down. This value is used to predict LTV and CPI.

Dashboard Panel—Analyze

In FIG. 5, the Analyze screen 421 may help dissect how various groups perform relative to other groups. This allows the embodiments to answer questions like:

Which AB Test variance should we collapse to?
Which errors should we fix first?
Which demographics, ad campaigns, and feature types should we invest in?

Essentially, the Analyze screen 421 allows the embodiments to determine which groups should be invested and divested in. Analyze can also allow us to figure out our ROI if changes were made "What if we fixed this error, and collapsed to this AB Test", and then take that ROI and make financial projections inside Strategize to determine the value of the product and whether it should be invested or divested in.

The dashboard user can edit each line query with button 502 and add a line to all both tickers by query with button 403. Editing a line query by typing group names will be facilitated with predictive auto complete. Button 504 will create a new set of two tickers under the current set with duplicate information, so edits can be made without losing the original. Button 503 will similarly create a new set of two tickers under the current set, but logic will automatically set line queries to illustrate which groups had the biggest impact on LTV over the time period.

Dashboard Panel—Dot Notation for Groups and Sets

Dot notation in the group name is used to construct a classification hierarchy which will be useful for analysis that compares metrics by classification using pattern matching from the dashboard investigate field 501. For example: If we have three ad campaigns, two using the keyword "shooter" that launched on 1/1/15 and 2/2/15 and a third with the keyword "builder" that also launched on 2/2/15 we could log them with the following notation in the log file, respectively:

"Ad=Adwords.Shooter.1/1/15"
"Ad=Adwords.Shooter.2/2/15"
"Ad=Adwords.Builder.2/2/15"

First the dashboard user puts their query in the investigate field 501. Every matching line is drawn on the two tickers (401, 402). For example:

Advertising campaigns that used the keyword shooter will be matched with this pattern (note the wild card): Ad=Adwords.Shooter.*

Ad campaigns that launched on 2/2/15 can be matched by: Ad=Adwords.*.2/2/15

All Adwords ad campaigns are matched by: Ad=Adwords.*"

and all ad campaigns are matched by: Ad=*

While "*" works as a complete wild card that matches with anything,

"?" works as a limited wild card which will not match anything containing a dot.

So:
"Adwords.*" matches with"Adwords.a"
"Adwords.*" matches with "Adwords.a.b"
"Adwords.?" matches with "Adwords.a"
"Adwords.?" Does not match with "Adwords.a.b"
"Adwords.?.b", "Adwords.a.?", and "Adwords.?.?" all match with "Adwords.a.b"

A query in the "investigate" field 501 will identify all matching groups and create a line query and curve for each of them. Those line queries will fall under legend 404 in FIG. 5, and can be edited with the 502 button.

Dashboard Panel—Line Queries

Dashboard users will edit line queries with button 502 to identify which groups of users should be included and excluded on the curves drawn on the ROI and LTV Tickers. At any given time the product consumer is placed into various groups. Groups are mutually exclusive within sets. The set name is found to the left of the equal sign in the group name. For example "Ad=FBCampaign.1/1/15" is notation indicating that group is within the Ad set. This notation is used in line queries, and in the data stores and logs used to implement the system.

The log file identifies group membership using the above notation. Groups and sets can have hierarchy, and any level of that hierarchy can be queried to create the line. The line query "Ad=FBCampaign.1/1/15" includes users that are in the "Ad" set, and in the "Ad=FBCampaign.1/1/15" group within the "Ad" set. Whereas the line query "Ad=FBCampaign" finds users that are in the "Ad" set, and includes any group who's name starts with "Ad=FBCampaign."

The query language not only identifies groups for inclusion, but by putting a minus (−) sign in front of the group, the dashboard can also exclude groups. In fact we can have multiple groups in a line query. Just as the minus sign indicates exclusion, the plus sign (or no sign in front of the first group) indicates inclusion. For example:

"Ad=FB.1/1-Gender=F" queries the data set where the ad campaign is FB1/1 and excludes the data set gender=F from that data set.

The query "Ad=FB.1/1+Gender=F" includes all users in the "Ad=FB.1/1" group and all users in the "Gender=F" group.

Dashboard Panel—Strategize

In FIG. 6, the Strategize screen 422 uses ROI information as well as cost information to assess the profitability of the product being measured. This will aid in strategic decision making by clarifying answers to questions like:

What is ROI today and what is its potential?
How big should our pivots be?
What is the right team size and ad size given this games placement and potential versus portfolio?

All of the inputted events will be shown in grid 602. These events can be edited or removed. There are different types of events, each with its own set of parameters and calculations. These include:

fixed cost: The amount of money is deducted on a set date.
ad spend: The amount of money is deducted on a set date, then that cost is multiplied by ROI and that value is credited back linearly over a time interval.
reoccurring: The amount of money is deducted on a set date, and over and over again at the time interval specified.

These events are converted into a net profit vs time line graph 603 and a Cost and Revenue vs time graph 604.

Process Overview

Figure 3:
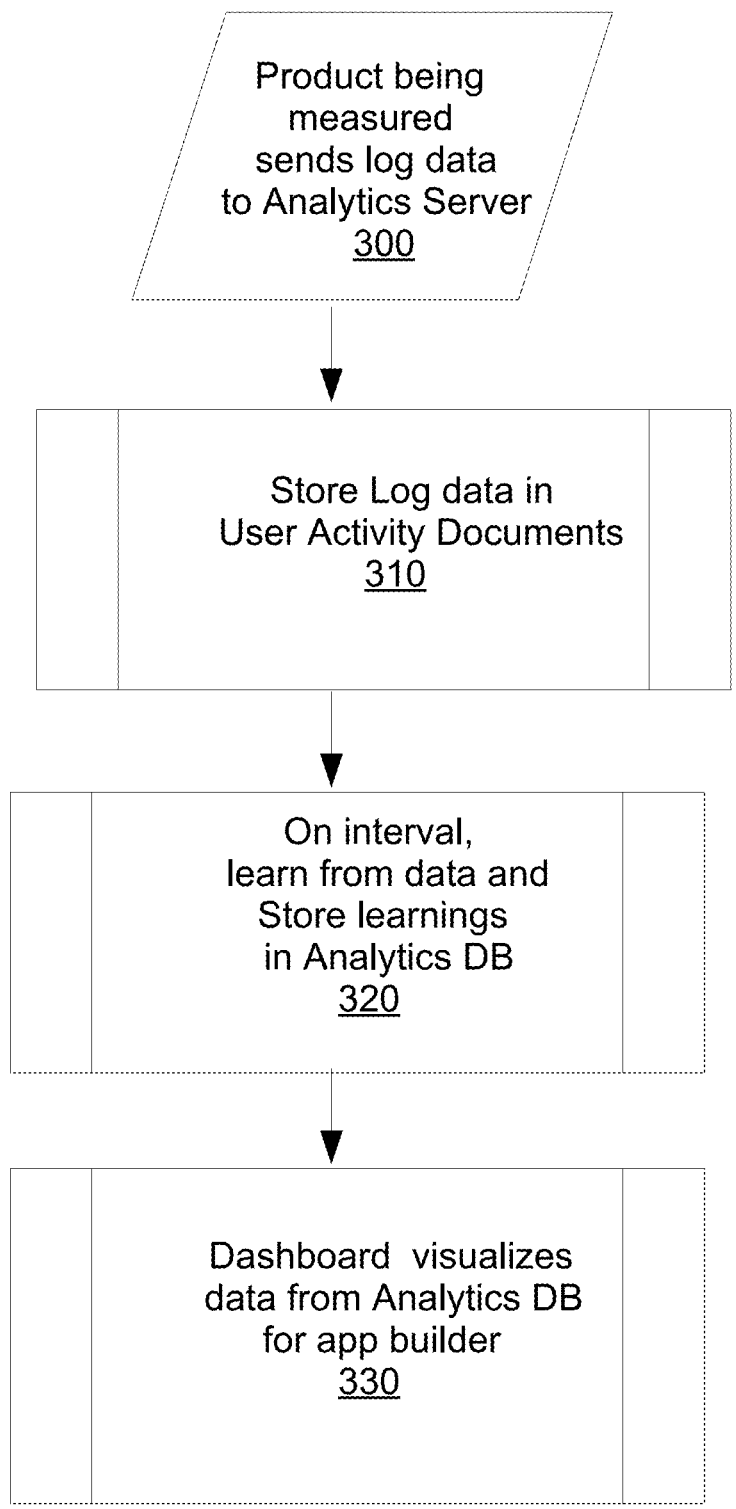
FIG. 3 is a schematic flowchart diagram illustrating one embodiment of return on investment prediction processes.

FIG. 3 connects the major processes required to support the user interface (UI) described in FIGS. 4-6. In block 300 the product being measured sends log data to Analytics Server Cluster 203. Then in block 310 that log data is organized and stored in User Activity Documents. In block 320 Data from User Activity Documents is used for our learning algorithms. These algorithms predict LTV and CPI and then create models that correlate group membership to those values. The data that describes those models is stored in the Analytics database, which in block 330 can be visualized for the administrators of the products being measured through a dashboard which queries the Analytics database for models between time stamps and graphs those models (per design in FIG. 4 and FIG. 5).

The three main processes that make up the system, namely logging, learning, and user-dashboard interactions are as follows in Table 1.

TABLE 1

| | Objective | Initiated | Inputs | Output Description |
|---|---|---|---|---|
| Logging | Collect usage data, specifically playtime, money spent, and group membership for each user on each product at every time. | Log is sent up to our system from the applications being measured. | A log contains: userID, product ID, timestamp, new group memberships over the time range, new burns over the time range | See FIG. 9B User Activity Document: A document file per user-product made up of entries. Each entry consists of a timestamp, all group memberships at that time, and all aggregate burn values at that time. A new entry is added to the user document whenever a burn value or group membership changes |
| Learning | Learns models to predict LTV and CPI, as well as correlations between CPI and group membership, and LTV and group membership. | As soon as the time interval for the previous bucket has elapsed | User Activity Document for each user-product. | see FIG. 10 The "Analytics database" contains weights for CPI and LTV GCMs, (group correlation models) and sample counts for each group. |
| Dashboard User Interaction | Surface learned models to the application maker for the purpose of measurement, analysis, and strategy | When a person interacts with the Dashboard on behalf of the organization that created the product being measured | Described in Detail in FIG. 4, FIG. 5 and FIG. 6 | Described in Detail in FIG. 4, FIG. 5 and FIG. 6 |

Responding to Dashboard API Requests with Data from the Learned Model.

The Dashboard can create the ROI, LTV graph lines for the inclusion or exclusion of any group by getting the LTV and CPI model weights for each timer frame, from the API and calculating the resulting LTV, CPI.

Drawing Curves for Line Queries

Figure 7:
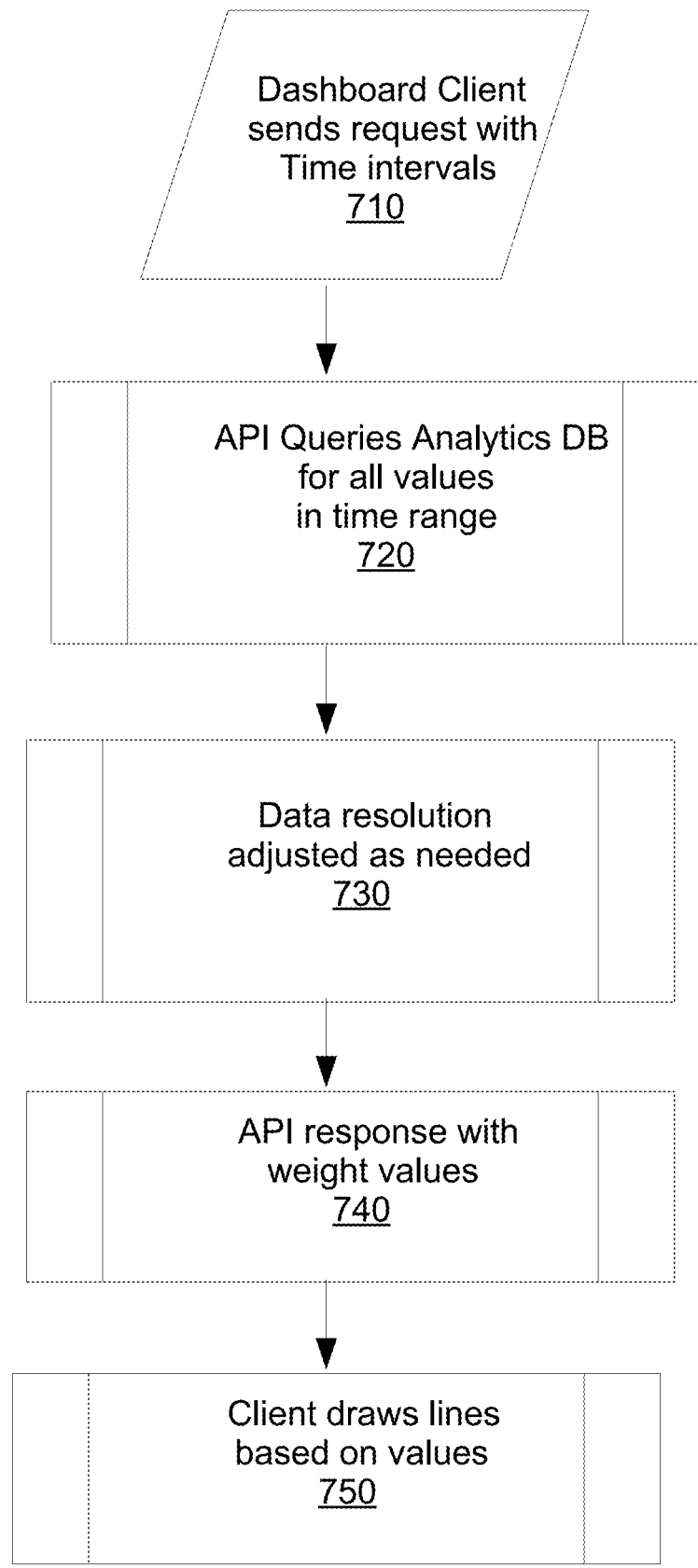
FIG. 7 is a schematic flowchart diagram illustrating one embodiment of processes for line queries.

FIG. 7 shows a schematic flowchart diagram of a process for line queries. Once the dashboard user chooses a new time frame (or in the case of measure on initialization) the client will send a request to the server with the time range, as illustrated by block 710. Block 720 shows the API querying the Analytics database for all values of weights for the LTV and CPI GCM as well as sampling information for each group between the time ranges.

Block 730 protects against too much data by adjusting the data resolution. Techniques for this include averaging data into bigger intervals, or using alternate tables constructed at the learning layer specifically over larger time intervals.

The Dashboard API responds in block 730 with a comma separated list of all model information for each time stamp after an ordered list of groups. The information associated with a time stamp includes all GCM (Group Correlation Model) parameters for the CPI and LTV as well as sample counts for each group.

The returned data will include, at each time stamp and for each group, weights for the LTV GCM, CPI GCM, and sample count. FIG. 9A is one example of the returned data 423.

Notice that by declaring the group names, we are able to map LTV, CPI, and sample "triples" in the data to the correct group using the respective ordering. Also note that by returning a time interval and a start time (using UNIX epoch time) we can simply list the values for each group, and can calculate the time stamp associated with each list of values.

A line query allows for the inclusion and exclusion of groups using the + notation for inclusion and − for exclusion. Given a line query, GCM data, and sample counts, we can find the output by using the GCM to score each set by the following rules:

If a group is explicitly included, implies groups in that set not explicitly included are explicitly excluded. The opposite is true if a group is explicitly excluded then all groups in that set not explicitly excluded are explicitly included.

Any set mentioned in the query will have a score equal to the weighted average of all of the weights of included groups in that set. For sets not mentioned in the query, we use the weighted average of all groups in that set. The "weighted" average refers to adding terms of sample counts of each group multiplied by the corresponding learn weights for that group and then dividing over the sum of the samples from each term over.

For every timestamp on the graph, the client will draw curves for each line query by calculating the LTV and CPI at that time. The LTV graph will use the calculated LTV value, and the ROI graph will use the LTV/CPI value.

Recommend

Figure 8:
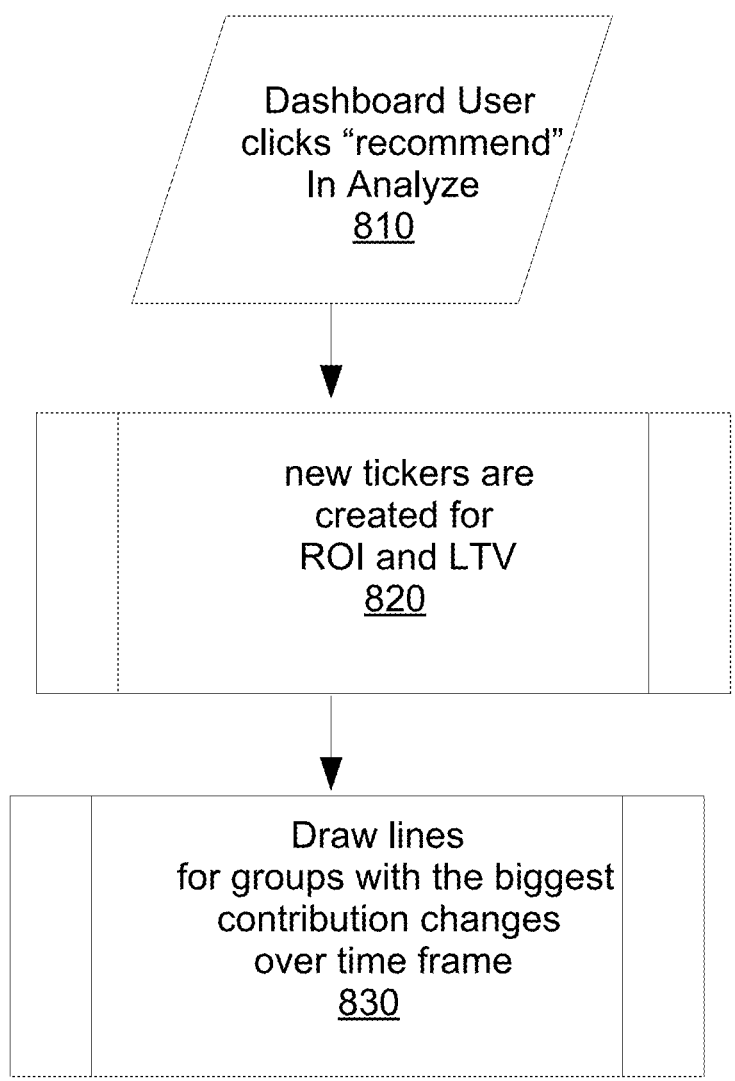
FIG. 8 is a schematic flowchart diagram illustrating one embodiment of a recommendation process.

FIG. 8 shows a schematic flowchart illustrating a recommendation process. Blocks 810 and 820 illustrate that when the dashboard user clicks the recommend button 503, two new tickers are created on the UI, one for ROI, and one for LTV, with new line queries and new curves. Line queries for groups with the biggest LTV GCM weight difference between the beginning and end time will be automatically chosen.

Analytics Database

In FIG. 10 illustrates an example of the analytics database 424 that stores all of the weights for the LTV and CPI GCM as well as sampling counts for each group. Note that first the groups are defined as is the sets they belong to.

The group definitions indicate which values correspond with which features since the list of groups and sets are dynamic. Because the features are derived from the existing groups at a particular time, we add an entry to re-list the existing groups in the system whenever there is a change to the group membership (a new one is added, or an old one is pruned), and data under that entry will be associated with that group membership.

The key for each row of data in the "timeseries" object, is the time stamp. The values at a particular time stamp describe the LTV GCM learned weight, CPI GCM learned weight and sample counts for each respective group listed in the above group object.

Learning Models

The next few techniques involve "learning" models that predict and correlate. The paradigm for "learning" involves converting the raw input vector into a vector of features followed by running a series of data samples called "training data" (that include feature values and outputs) through an algorithm to learn the weights for features that best predict the output. During "supervision" the more general characteristics of the algorithm are tuned by optimizing for performance against test data.

Inputs, Features, and Outputs

Table 2 describes properties of the different learned models.

TABLE 2

| Model | Inputs | Features | Output |
|---|---|---|---|
| Spent Prediction | burn components (except total spent), group memberships, time since install, product characteristics | every input, every burn component$^n$, every burn component$^n$ times every group, every burn component$^n$ times every group time every product characteristic | total spent |
| Installs Prediction | ad campaign, time since install, product characteristics | ad campaign, time frames since install$^n$, product | total installs |
| LTV GCM Cost GCM | Group memberships for each sample. Group memberships are binary, where every possible group is listed, those the user is a member of get a value of 1 and those the user isn't get a value of 0. | directly taken from inputs. | LTV CPI |

Group membership inputs and features refer to a binary indication of whether the user is in a certain group.

Burn components refer to aggregate values the application consumer has sacrificed in his interactions with the application. These always include money spent, time spent, but can also include other indicators. Any action the user takes that has a real cost for them will be tabulated and included as an input to LTV prediction.

In the LTV features explanation "every input, every burn component, every burn value times every group, every input means every input" should be used as a feature directly. Other features include "every burn component$^n$" which means every burn value to be raised to the power of n should also be a feature where n can be any or all numbers between $-10$ and $10$ (at $\frac{1}{6}$th increments). So in the case of having 4 burn components, "every burn component$^n$" describes 480 features. "Every burn component$^n$ times every group" describes feature like "money spent" to the third power times the binary input "is in group ad=1.1.15". In the case that we have 4 burn components and 40 groups, this would refer to $480*40=19200$ features. Since not all of these features will be significant, we can determine a subset of features to use. One way to determine that subset would be to train against all features in a supervised setting and then prune out those with negligible contributions (any whose absolute value of the weight is near 0). Another method for finding the features, would be to use a neural net with 1 or more hidden layers, and in a supervised setting determine which features were activated by the neural net. A third method would be to use the neural net directly in the live solution and learn the hidden features in production.

The input class "product characteristics" is represented with binary features like groups. We can describe a hierarchy of products like "genre=isobuilder" and "id=skytopia" with a feature for every part of the hierarchy, so in this case for every genre and every id, with values of either 1 or 0. We can also include product features which will generalize characteristics that could lead to differing user behavior patterns like "is_mobile_app" or "contains_story".

A part of the transformation from inputs to features could include the calculations of feature scaling and mean normalization or similar transformations as well if beneficial.

Predicting Installs and Money Spent.

Figure 11:
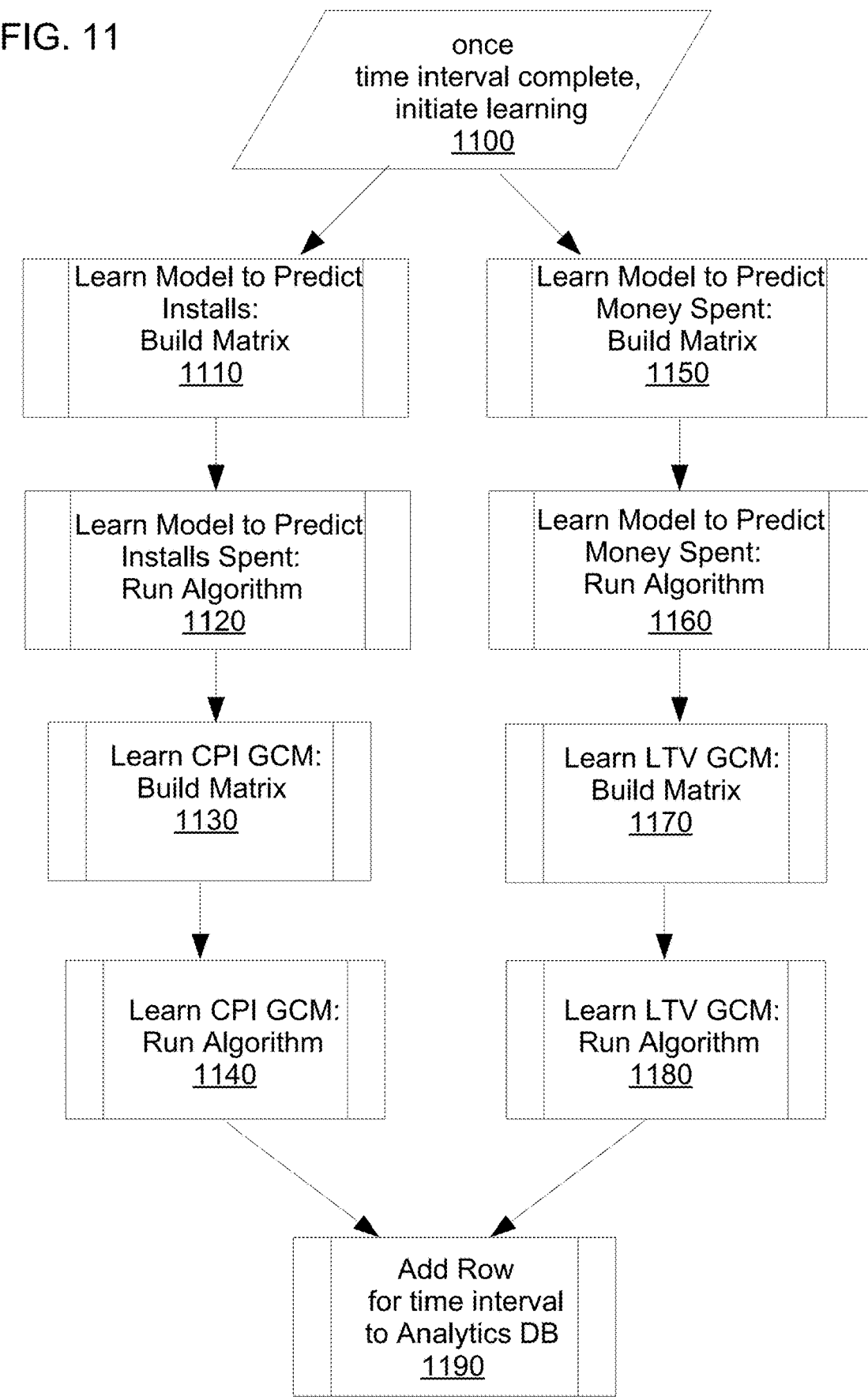
FIG. 11 is a schematic flowchart diagram illustrating one embodiment of a build process.

FIG. 11 demonstrates how to build models that correlate and predict from activity logs. As illustrated in block 1100, the process is initiated once an interval is complete, and thus activity logs for that interval are no longer being written to.

The embodiments create two predictive models:

Installs Predictor Model will be predict as the amount of money an ad campaign costs divided amount of users acquired at a particular time after install Spent Predictor Model will predict how much money a user will spend at any particular time after install.

Block 1110 builds a matrix of features and output. To do this we collect inputs from each users User Activity Document just as we do in block 1150. An example of the user activity document 425 is depicted by FIG. 9B. A User Activity Document 425 is created for each consumer on each product and contains the set/group memberships as well as aggregate burn values for that user at every time stamp. The User Activity Document 425 is stored within the Database cluster 204.

The space of all groups is defined above the comma separated values since they are dynamic. The comma separated list begin with the time interval, then list the aggregate values for the burn components, then the values for each group listed. When group membership changes, the new membership is declared above the data that assigns values to it.

Inputs are found by "going back in time", thereby making a predictive model by using data where the current value is the output for all values from previous time frames as inputs.

One of the inputs into both the "Spent" predictor model and the installs model is the time interval that has elapsed since the users install, and another is the amount of time in the future we are trying to predict (time between the current frame and the origination of the data sample). Thus we are able to create a row of data for every subsequent time interval from the present, using the present values of total spent for the spent prediction model, and total installs for the installs prediction model.

In blocks 1120 and 1160 the embodiments run an algorithm to find the weights to assign each feature in our model. Once this is complete we have a model that can predict the total amount a user with a particular group definition will spend at any given time in the future, as well as a model to predict how many users any ad campaign will have brought in, in total at a given date in the future. Once these models are ready, we use this prediction ability to build our next step of models, The CPI GCM, LTV group correlation models (GCM).

GCMs

The objective of the GCMs is to be able to quickly calculate the output (LTV or CPI) given information regarding which groups to include or exclude. Groups belonging to the same "set" are mutually exclusive of each other. Set information is encoded in the log files, User Activity Document and Analytics database.

The GCM is simply a list of the best weights where features are binary group membership values to arrive at the appropriate outputs (in our example for LTV and CPI).

Blocks 1130 and 1170 represent matrix creation. We get our rows of inputs by creating a row for each user based on the group memberships at the current time interval, and we find the output for each our metrics from looking at what the predictive models predict for that user on the "last day" (as defined from the dashboard settings). Once we have the matrix, block's 1140 and 1180 can create the GCM with techniques generally used to solve linear regression problems (like gradient descent or with the mean normal technique). Since our objective is to correlate and not predict.

Finally block 1190 illustrates adding a row of data which contains GCM learned weights and sample counts at every timestamp to the Analytics database, along with the amount of samples represented by each group.

Implementation Tweaks—Brands and Product Hierarchy

The value proposition provided is not limited to the traditional definition of products, but also product hierarchy. While a brand may have several products associated with it, it itself is a product. "Product" refers to either the end product or any part of a hierarchy where a product can consist of other products.

Time Value of Money

In order to account for the time value of money, when creating the "Money Spent" matrix, where the total money spent at any given time for all subsequent time intervals is the output, in block 1160 we would adjust that output using a present value equation. So instead of using an output of Y for the total amount spent, we use the "present value" of Y at the time interval that is being simulated.

Optimizing Prediction

The system has been described a time based model that needs to use all data that ever existed for every time frame. One optimization is to use previous learnings instead of previous data. Instead of integrating all data that ever existed, we will integrate with a model that has learned from all of the data that ever existed. To achieve this we will feed inputs that represent only the changes since the last model was created, as well as the vector of the weights for the model that represents all subsequent learning, the cumulative previously learned weights.

Below is the modification we would make to our Money Spent and Installs prediction pipeline to take advantage of this optimization.

Using Linear Regression, or the normal equation method, we learn the weights for a learning hypothesis h as shown in Equation 1, where i is an instance of activity data and x is an activity database.

$$h_i = \theta x_i \qquad \text{Equation 1}$$

The weight is learned to minimize the cost function J of Equation 2 where m is a number of activity data samples in a current batch, n is a number of features, xi is an activity input vector, $\theta_j$ is the learning weight vector, $\Theta_j$ is the previous learning weight vector, $h_i$ is a hypothesis for the learning weight vector, $y_i$ is an activity data instance, D is a constant, and S is a sampling ratio. The learning weight vector may be an income learning weight vector and/or a cost learning weight vector.

$$J = \frac{1}{2}m\sum_{i=1}^{m}(h_i - y_i)^2 + DS\sum_{j=1}^{n}(\theta_j - \Theta_j)^2 \qquad \text{Equation 2}$$

$\Theta$ represents previously learned weights (representing learning over all previous datasets), the cumulative previously learned weights, after a treatment where the time interval input has been incremented by 1 and its value propagated into the features.

Here $\theta_j$ and $\Theta_j$ iterate through all feature weights. In the depicted embodiment, the learned weight vector $\theta$ may be recalculated incrementally as a function of a previous learning weight vector $\Theta$ and current activity data.

D may be a constant of around 0.5 (which is tuned during learning supervision) that is used to counter balance the bias from the previous learned model that nothing there was no new user activity, by double counting the new user activity.

S is the sampling ratio that represents the ratio of samples represented by the already learned values, and the samples in the "changed" data. It would equal t/(m+t) where t is D times the previous m+t starting at the third model that is learned. The value oft during for the first model that is learned will be some constant we tune during supervision so DS can form an effective value. The value for t during the second model learning will be the m used in the previous model calculation.

The differences in the processes described in FIG. 11 with this optimized process include the embodiments must store the last learned weight vectors for our Spent and Installs prediction models.

When the embodiments access a User Activity Document to find inputs into the predictive matrix, the embodiments only use values that have not yet been incorporated into the subsequent learnings (cumulative previously learned weights). Thus only changes since the last interval are used. In fact User Activity Documents 425 that have not changed since then do not need to be opened. This can also lead to an file input/output optimization where User Activity Documents 425 are split into buckets based on the time interval, so the minimal required amount of data is read into memory. In fact, having a User Activity Document at all no longer becomes essential to the system. Thus instead of going through the step of creating a user activity document, and then later building out the LTV and CPI input matrixes from it, we can add simply add rows to those input matrix as data comes in to the server.

The Cost function, J uses cumulative previously learned weights (as illustrated above) as well as an input matrix. Alternative weight integration options can also be used.

Features

The embodiments improve prediction accuracy of the Spent and Installs Predictors by learning models with data from other products as well as the one being analyzed. One way to do this is to add the binary feature "is product being measured" with value 1 for the product being measured and 0 for other products, and then include data from other products. We can also add other binary features that describe products, like "is game", "is mobile app", and "is isomorphic game". This technique enables us to reap the benefit of data we have from other applications to inform our predictions.

Using Learned Weights as Learning Inputs

Often one set of an input matrix into a learning algorithm can benefit multiple pipelines. The embodiments may reuse not only the data from previous time interval into the current one, but how to do it efficiently by using the learned weights as inputs instead of the actual data set. The embodiments may subtract the learned weights from the previous model, from the weight variables in the cost function, and some additional transformations in order to penalize outputs that diverge from the ones we have already learned.

Learning from Many Other Products

The embodiments may reap the benefit of the data and learning from other products and have access to data from so many products that the use of Equations 1 and 2 may be prohibitive. In such cases alternative methods may be employed.

Figure 12:
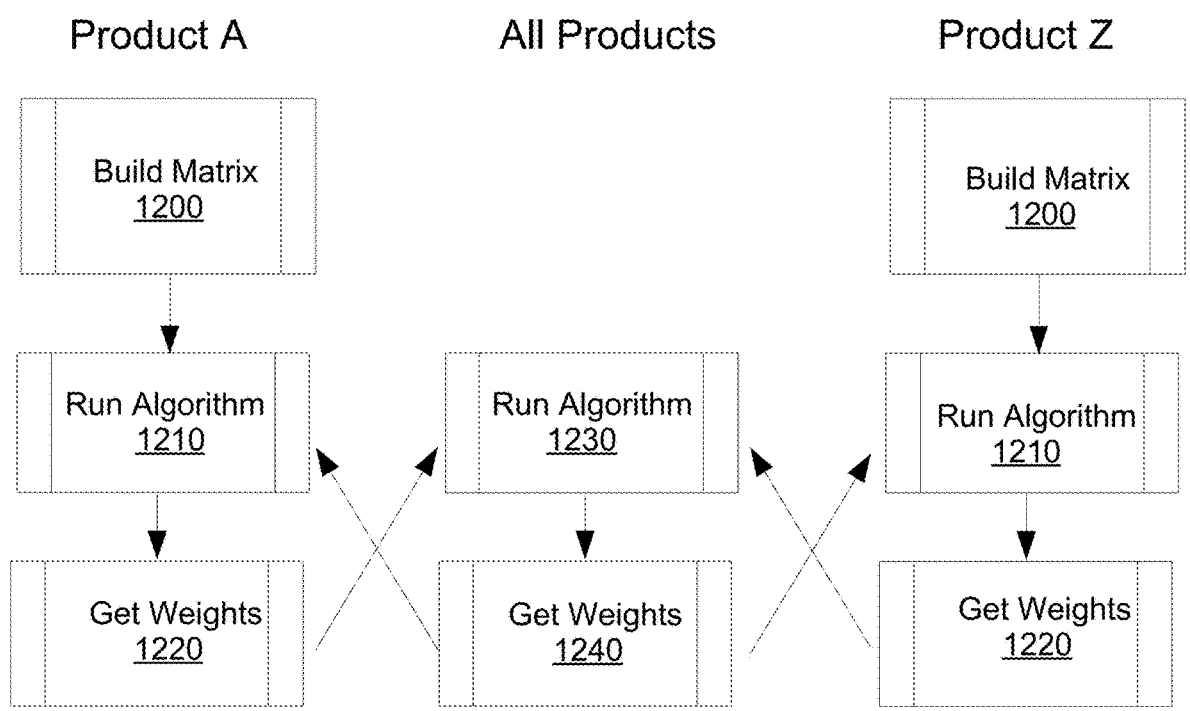
FIG. 12 is a schematic flowchart diagram illustrating one embodiment of a learning process.

FIG. 12 shows learning predictive models for many products, and each product benefit from the data and learnings from other products in a performant way. In block 1200 each product builds a learning matrix based on its own data. In block 1230 the "all products" learning pipeline can use the learned weights from each product as its input, or actual data coming from each product. Arrows from block 1240 to block 1210 show the weights learned by the "All products" for various predictive models (e.g. LTV or CPI) can be incorporated into the learning for each product's corresponding predictive models as described hereafter. FIG. 12 is an example of cross learning between models for different products.

Alternative Implementation: Run Batch after M New Rows

Instead of waiting for an interval of time to initiate the learning process that ultimately adds a new row into the Analytics database 424, we can wait for a certain amount of new data (this value would be configured in an Admin panel). This would ensure a minimum sampling before the algorithm is run. In such a system we would simply have to make sure that the amount of samples at a given time interval are taken into account when data resolution is calculated. We can also wait for a combination of time and data, for example one policy could be to run learning algorithms when we have 10K rows of data or after 10 minutes (whichever happens first). Another example policy could wait until both a data amount and time requirement have been met.

Pruning Groups and Sets

Because the cost of the learning processes that the system relies on is correlated to the amount of groups and sets that exist, and because set and group existence usually eventually becomes outdated, we want to be able to retire groups (and once all groups in a set are retired the set is also retired). To accomplish this, the logic that writes group memberships into the User Activity Document 425, will not only look at previous group memberships, but check with a central authority whether those groups still exists. A map of all groups with a Boolean value as to the group's existence will be kept and will be used to inform the GCMs which groups to use, as well as dictate which groups are allowed to be maintained in the User Activity Document 425. This central authority for group existence will know the approximate "last logged" time of each group, and if that time was over the group expiration time (a configurable value), then the group's activation status is set to false in the map. Only sets associated with active groups, and active groups will used to create GCMs.

Alternate Uses: Beyond LTV

LTV and CPI are concepts that recorded the two opposing sides of cumulative monetary transactions, but this system can be used by interchanging LTV and CPI for two opposing sides of other types.

The total spent predictor does not have to necessarily predict the total spent, but instead could predict any metric which is a goal. For example, a school might have a website with the goal of higher test scores, then LTV would refer to the test scores. Implement this is as simple as logging whatever the goal matrix we are trying to maximize as "spent."

Figure 13A:
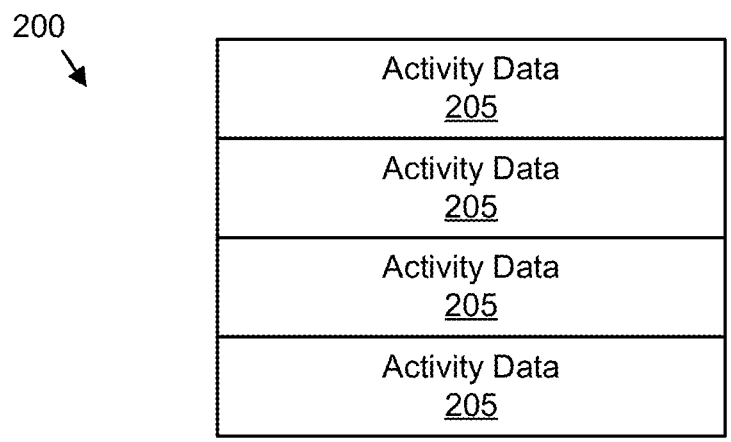
FIG. 13A is a schematic block diagram illustrating one embodiment of an activity database.

FIG. 13A is a schematic block diagram illustrating one embodiment of an activity database 200. The activity database 200 maybe organized as data structures in a memory. The activity database 200 includes a plurality of activity data 205. The returned data 423, the user activity document 425, and the analytics database 424 are examples of activity data embodiments, but are not limiting. The activity data 205 is described in more detail in FIG. 13B.

Figure 13B:
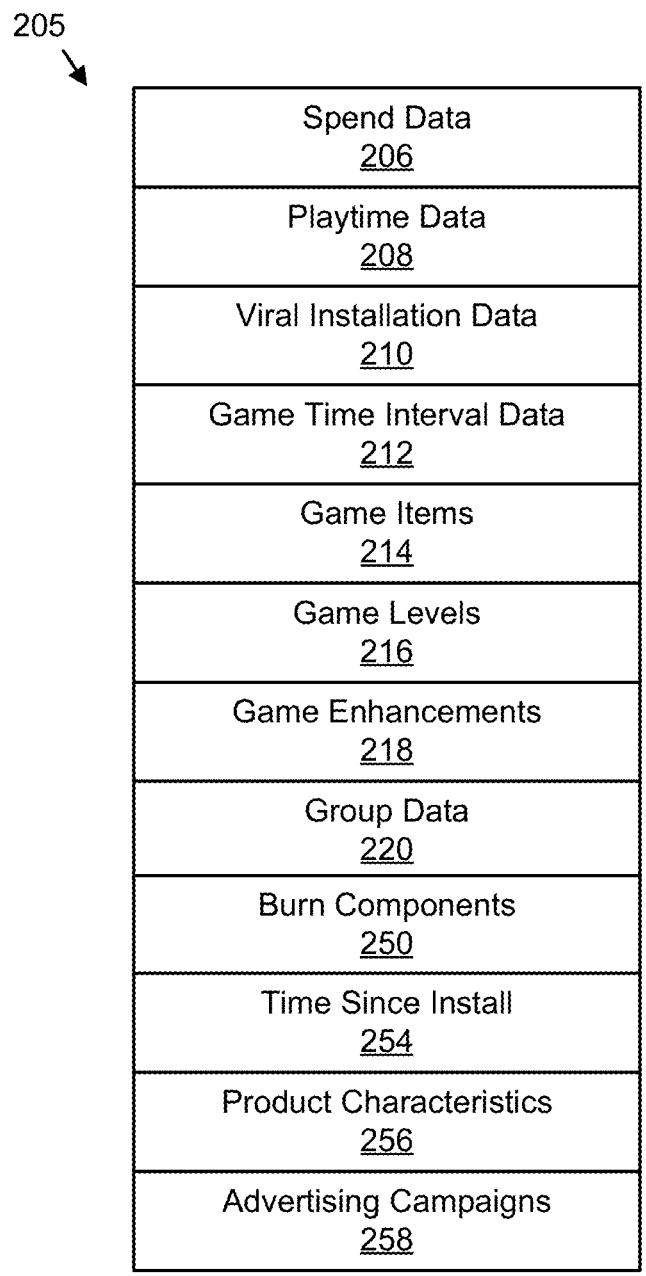
FIG. 13B is a schematic block diagram illustrating one embodiment of activity data.

FIG. 13B is a schematic block diagram illustrating one embodiment of the activity data 205. The activity data 205 maybe organized as a data structure in a memory. In the depicted embodiment, the activity data 205 includes spend data 206, playtime data 208, viral installation data 210, game time interval data 212, game items 214, game levels 216, game enhancements 218, group data 220, burn components 250, time since install 254, product characteristics 256, and advertising campaigns 258.

The spend data 206 may record a consumer's purchases for a software product such as a game. The playtime data 208 may record times when the consumer is interacting with the game. The viral installation data 210 may record installations of the game that are a result of the consumer. The game time interval data 212 may record one or more time intervals during which game playtime occurred.

The game items 214 may record items acquired during play the game. The game levels 216 may record level advancements achieved by the consumer. The game enhancements 218 may record enhanced features acquired by the consumer during play the game. The group data 220 may group the activity data 205 with one or more groups. In one embodiment, the group data 220 includes a Boolean value indicating whether or not a consumer belongs to each group.

The burn components 250 may record indications of consumer sacrifice. The burn components 250 may include time spent by the consumer on a website, time spent by the consumer with an application, time spent by the consumer with the game, and the like.

The time since install 254 may record the time interval that the consumer has had access to a product. For example, the time since install 254 may record the time interval since the installation of the game product.

The product characteristics 256 may describe features of the product. For example, the features may include a version number, a model number, option selected by the consumer, options that are standard with the product, and the like.

The advertising campaigns 258 may describe advertising done to promote the product. For example, the advertising campaigns 258 may the campaign message, the campaign media, the campaign duration, a number of consumers reached by the advertising, and the like.

Figure 13C:
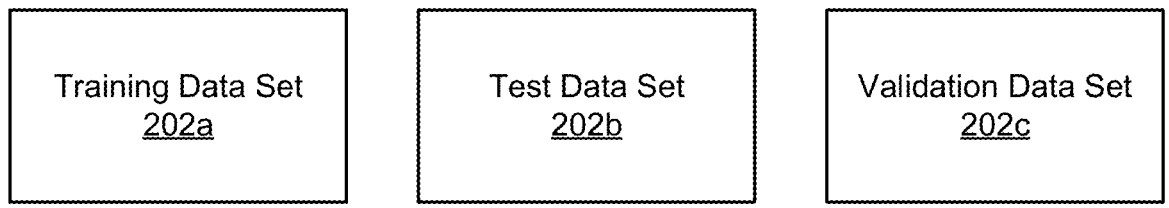
FIG. 13C is a schematic block diagram illustrating one embodiment of data sets.

FIG. 13C is a schematic block diagram illustrating one embodiment of data sets 202. The activity data 205 of the activity database 200 may be divided into three data sets 202. The data sets include a training data set 202a, a test data set 202b, and a validation data set 202c. The training data set 202a may be used to train model types as will be described hereafter. The test data set 202b may be used to as will be described hereafter. The validation data set 202c may be used to calculate algorithmic parameters as will be described hereafter.

Figure 13D:
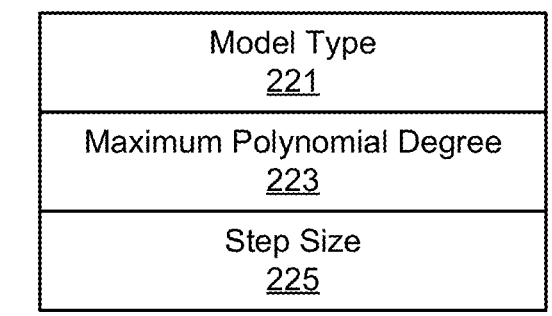
FIG. 13D is a schematic block diagram illustrating one embodiment of algorithmic parameters.

FIG. 13D is a schematic block diagram illustrating one embodiment of the algorithmic parameters 227. The algorithmic parameters 227 maybe organized as a data structure in a memory. In the depicted embodiment, the algorithmic parameters 227 include a model type 221, maximum polynomial degree 223, and a step size 225. The algorithmic parameters 227 may be model parameters for analyzing activity data 205.

The model type 221 may be selected from the group consisting of a polynomial model, an exponential model, and a sigmoid model for a consumer activity model. The maximum polynomial degree 223 may indicate a maximum number of degrees of a model polynomial expression for the consumer activity model. The step size 225 may indicate a size of an incremental step for the consumer activity model.

FIG. 13E is a schematic block diagram illustrating one embodiment of a consumer activity model 240. The consumer activity model 240 maybe organized as a data structure in a memory. In the depicted embodiment, the consumer activity model 240 includes the algorithmic parameters 227, the income learning weights vector 241, the cost learning weights vector 243, a lifetime value model 245, a cost per install model 247, and a return on investment 249.

The lifetime value model 245 may be generated using the income learning weights vector 241 as will be described hereafter. The cost per install model 247 may be generated using the cost learning weights vector 243 as will be described hereafter. The return on investment 249 may be calculated from the lifetime value model 245 and the cost per install model 247.

Figure 14A:
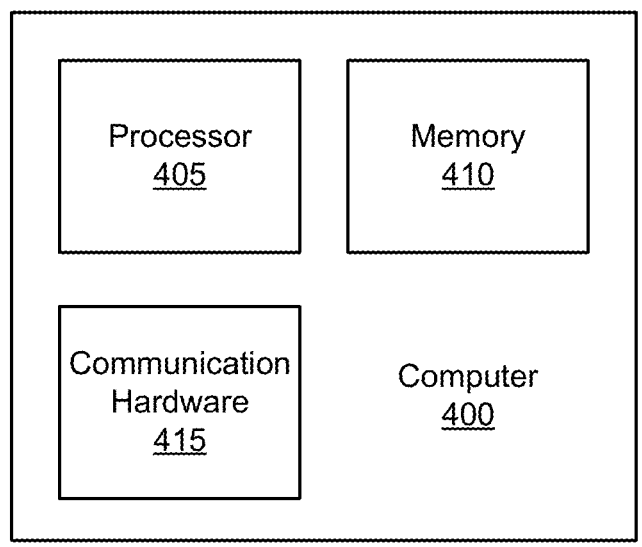
FIG. 14A is a schematic block diagram illustrating one embodiment of the computer.

FIG. 14A is a schematic block diagram illustrating one embodiment of the computer 400. The computer 400 may be embodied in the server cluster 103 and/or the analytics server cluster 203. In the depicted embodiment, the computer 400 includes a processor 405, a memory 410, and communication hardware 415. The memory 410 may comprise a semiconductor storage device, a hard disk drive, an optical storage device, a micromechanical storage device, and combinations thereof. The memory 410 may store code. The processor 405 may execute the code. The communication hardware 415 may communicate with other devices.

Figure 14B:
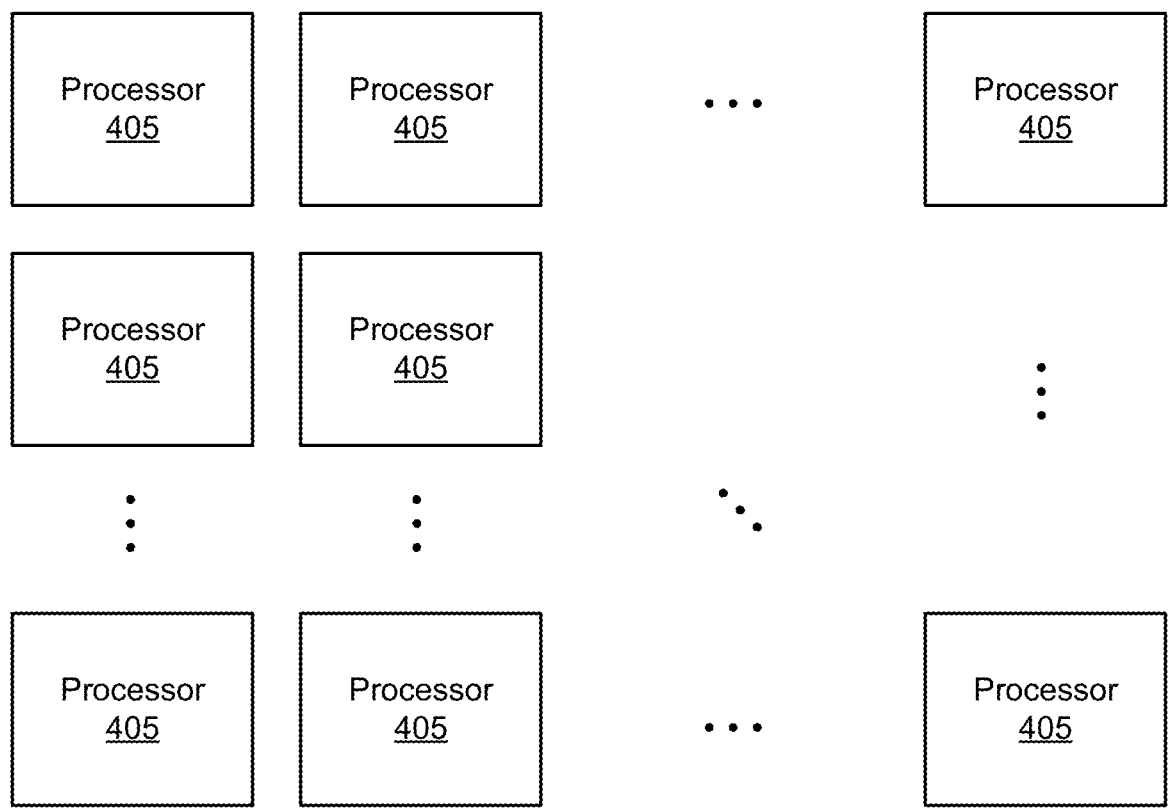
FIG. 14B is a schematic block diagram illustrating one embodiment of an array of processor computing resources.

FIG. 14B is a schematic block diagram illustrating one embodiment of an array of processor computing resources 405. Processors 405 may be allocated to predicting a return on investment based on the current and previous lifetime value group correlation models and current and previous cost per install group correlation models.

Figure 15A:
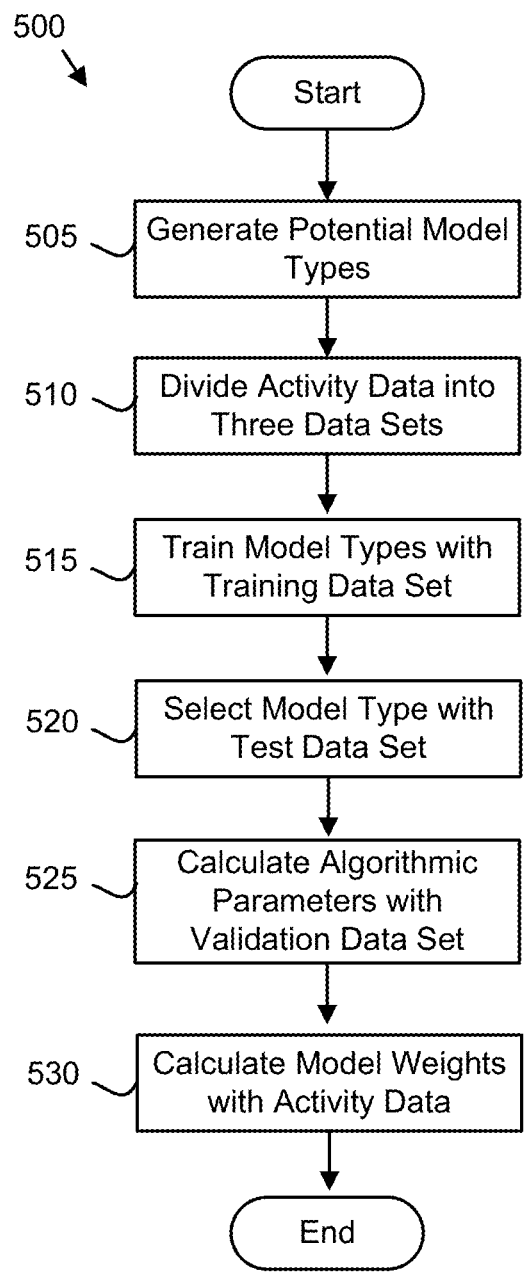
FIG. 15A is a schematic flowchart diagram illustrating one embodiment of a consumer activity modeling method.

FIG. 15A is a schematic flowchart diagram illustrating one embodiment of a consumer activity modeling method 500. The method 500 may generate the consumer activity model 240. The consumer activity model 240 may include the algorithmic parameters 227, the cost learning weight vector 243, and the income learning weight vector 241. The method 500 may be performed by the processor 405. Alternatively, the method 500 may be performed by a computer readable storage medium such as the memory 410.

The method 500 starts, and in one embodiment, the code generates 505 one or more potential model types 221 for a consumer activity model 240. In one embodiment, the code generates 505 a polynomial model, and exponential model, and a sigmoid model. The model types 221 may be generated from a list.

The code may further divide 510 the activity data 205 into the training data set 202a, the test data set 202b, and the validation data set 202c. In one embodiment, the code divides the activity data 205 by allocating a specified percentage of the activity data 205 to each of the training data set 202a, the test data set 202b, and the validation data set 202c. Each data set 202 may receive 20 to 40 percent of the activity data 205.

The code may train 515 each of the model types using the training data set 202a. The model types may be trained 515 by finding the weight vector $\theta$ that minimizes the cost function J of Equation 2 against the training data for each model type.

The code may further select 520 a model type that minimizes the cost function of Equation 2. The cost function may be evaluated against the test data set 202b. The weights $\theta$ for the model type may be trained using the validation data set 220c.

In one embodiment, Equation 2 is minimized for the test data set 202b using the income learning weight vector $\theta$ 241 and the cost learning weight vector $\theta$ 243 for each model type. The model type that yields the minimum cost function J may be selected 520 and recorded as the model type 221.

The code may calculate 525 the algorithmic parameters 227 for the selected model type based on results against the validation data set 202c. In one embodiment, the algorithmic parameters 227 are selected to minimize the cost function J of Equation 2.

In one embodiment, the code calculates 530 weights based on results against the activity data 205. In a certain embodiment, the code calculates 530 a new income learning weight vector $\theta$ 241 and a new cost learning weight vector $\theta$ 243 for the consumer activity model 240 based on results against the plurality of activity data 205 and the method 500 ends. The new income learning weight vector $\theta$ 241 and the new cost learning weight vector $\theta$ 243 may be modified to minimize the cost function J of Equation 2. The consumer activity model 240 is embodied in the new income learning weight vector $\theta$ 241, the new cost learning weight vector $\theta$ 243, and the calculated algorithmic parameters 227 for the selected model type 221.

In one embodiment, the income learning weight vector 241 and the cost learning weight vector 243 are calculated 530 for a group of consumers. The group may be identified by the group data 220.

Figure 15B:
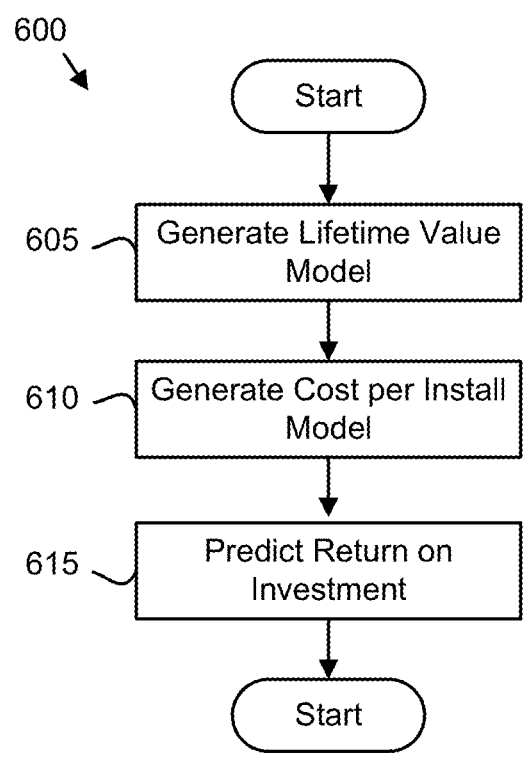
FIG. 15B is a schematic flowchart diagram illustrating one embodiment of a return on investment prediction method.

FIG. 15B is a schematic flowchart diagram illustrating one embodiment of a return on investment prediction method 600. The method 600 may generate a lifetime value model 245, a cost per install model 247, and/or predict a return on investment 249 based on consumer activity. The method 600 may be performed by the processor 405. Alternatively, the method 600 may be performed by a computer readable storage medium such as the memory 410.

The method 600 starts, and in one embodiment, the code generates 605 a lifetime value model 245 for a plurality of consumers using the income learning weight vector 241. The lifetime value model 245 may be generated 605 by modifying the income learning weight vector 241 to minimize the cost function J of Equation 2. The lifetime value model 245 may be discounted to a current value. Alternatively, the lifetime value model 245 may include a plurality of values over time.

In addition, the code generates 610 the cost per install model 247 for the plurality of consumers using the cost learning weight vector 243. The cost per install model 247 may be generated 610 by modifying cost learning weight vector 243 to minimize the cost function J of Equation 2. The cost per install model 247 may be discounted to a current value. Alternatively, the cost per install model 247 may include a plurality of values over time.

In one embodiment, the code predicts 615 the return on investment 249 for each consumer based on the lifetime value model 245 and the cost per install model 247 and the method 600 ends. The return on investment 249 may be predicted 615 as a difference between the discounted lifetime value model 245 and the discounted cost per install model 247.

In one embodiment, the code may generate 605 a second lifetime value model 245 for a second product for the plurality of consumers using the income learning weight vector 241 for a first product. In addition, the code may generate 610 a second cost per install model 247 for the second product for the plurality of consumers using the cost learning weight vector 243 of the first product. The code may further predict 615 a return on investment 249 for the second product using the second lifetime value model 245 and the second cost per install model 247. Thus elements of the consumer activity model 240 for the first product may be used to predict 615 the return on investment 249 for the second product.

FIG. 16 is a text illustration showing one embodiment of pseudocode 501 for the consumer activity modeling method 500 of FIG. 15A. The pseudocode 500 one may perform the functions of the method 500.

Figure 17:
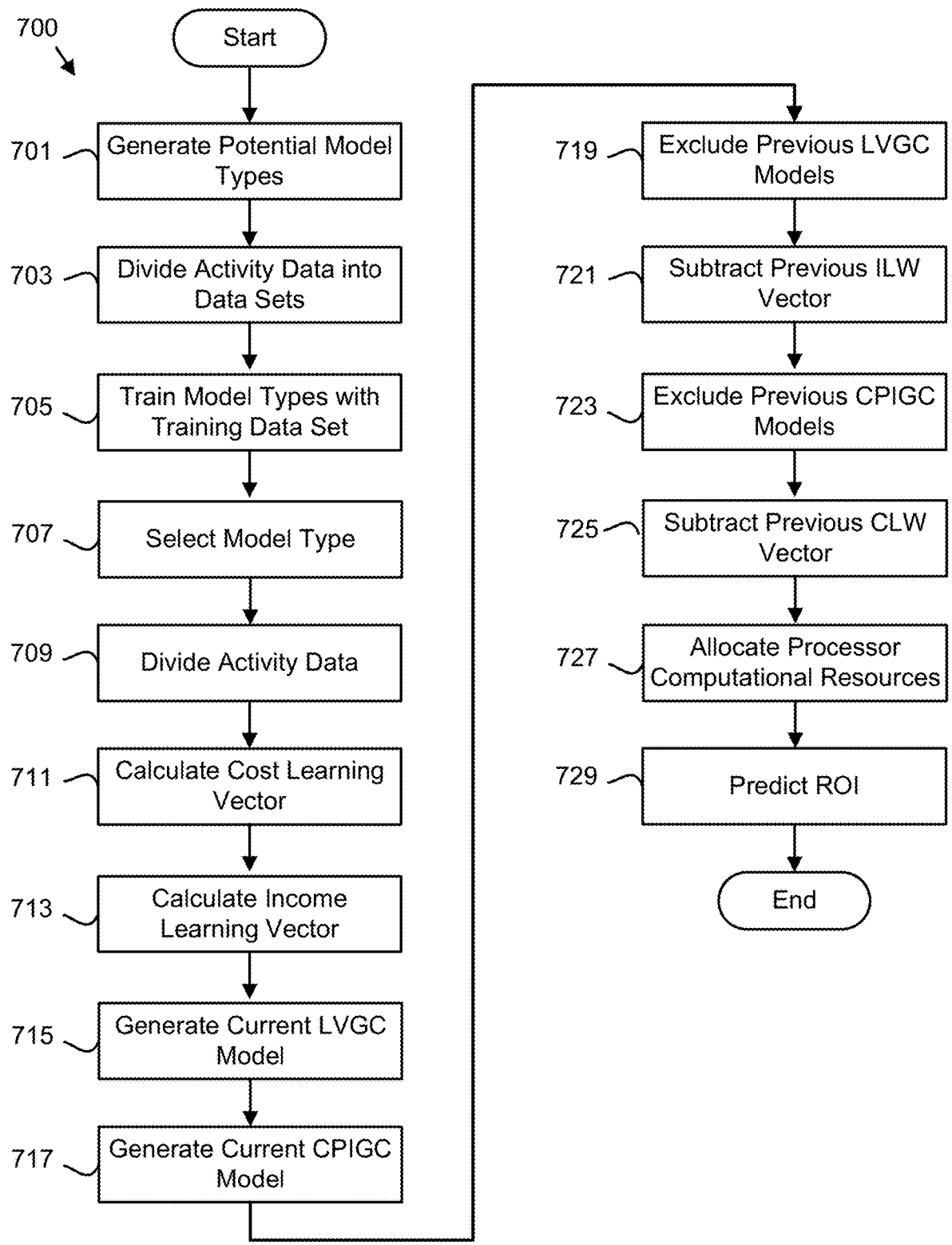
FIG. 17 is a schematic flowchart diagram illustrating one alternate embodiment of a return on investment prediction method.

FIG. 17 is a schematic flow chart diagram illustrating one embodiment of a return on investment prediction method 700. The method 700 may predict a return on investment 249 based on consumer activity. The method 700 may be performed by the processor 405 and/or one or more of a plurality of processor computational resources 405.

The method 700 starts, and the processors 405 may generate 701 one or more potential model types 221 for a consumer activity model 240. In one embodiment, the processor 405 generates 701 a polynomial model, and exponential model, and a sigmoid model. The model types 221 may be generated from a list.

The processors 405 may further divide 703 the activity data 205 into the training data set 202a, the test data set 202b, and the validation data set 202c. In one embodiment, the processors 405 divides 703 the activity data 205 by allocating a specified percentage of the activity data 205 to each of the training data set 202a, the test data set 202b, and the validation data set 202c. Each data set 202 may receive 20 to 40 percent of the activity data 205.

The embodiments train potential model types 221, select a model type 221, and calculate algorithmic parameters 227 for consumer activity model 240. The consumer activity model 240 may be used to predict the return on investment 249 for a consumer, a group of consumers, and/or a product. The return on investment 249 may be predicted for a product associated with the activity data 205. Alternatively, the return on investment 249 may be predicted for a second product that is not associated with the activity data 205.

The processors 405 may train 705 each of the model types using the training data set 202a. The model types may be trained 515 by finding the weight vector θ that minimizes the cost function J of Equation 2 against the training data for each model type.

The processors 405 may select 707 a model type that minimizes the cost function of Equation 2. The cost function may be evaluated against the test data set 202b. The weights θ for the model type may be trained using the validation data set 220c.

The processors 405 may divide 709 the activity data 205 into batches based on time interval. In addition, the processors 405 may calculate 711 a cost learning weight vector as a function of consumer characteristics using the activity data, selected model type, and algorithmic parameters using Equation 2. The processors 405 may further calculate 713 as a function of the consumer characteristics using Equation 2.

The processors 405 may generate 715 a current lifetime value group correlation model for a plurality of consumers using the income learning weight vector and activity data 205 in the current batch that has not been incorporated into the learning hypothesis for the income learning weight vector as inputs instead of the activity data 205 from previous batches. The current lifetime value group correlation model may be used in place of activity data 205.

The processors 405 may generate 717 a current cost per install group correlation model for installations of the consumer application for the plurality of consumers using the cost learning weight vector and activity data 205 in the current batch that has not been incorporated into the learning hypothesis for the cost learning weight vector as inputs instead of the activity data 205 from previous batches. The current cost per install group correlation model may be used in place of activity data 205.

The processors 405 may exclude 719 mutually exclusive previous lifetime value group correlation models. In addition, the processors 405 may subtract 721 a previous cost learning weight vector from the cost per install group correlation model to penalize divergent outputs from the learned outputs.

The processors 405 may exclude 723 mutually exclusive previous cost per install group correlation models. In addition, the processors 405 may subtract 725 a previous cost learning weight vector from the cost per install group correlation model to penalize divergent outputs from the learned outputs.

The processors 405 may allocate 727 the plurality of processor computational resources 405 based on the current and previous lifetime value group correlation models and current and previous cost per install group correlation models. In one embodiment, processors 405 of the plurality of processor computational resources 405 are allocated as a function of a number of rows of the activity data 205. In addition, processors 405 of the plurality of processor computational resources 405 are allocated as a function of a rate of receiving the rows of activity data 205.

In one embodiment, the processors 405 of the plurality of processor computational resources 405 are allocated to achieve a row target of rows of activity data processed per time interval. The time interval may be a second. The row target may calculated using Equation 3, NR is a number of unprocessed rows of activity data 205, RR is a number of rows of activity data 205 received per time interval, and k is a nonzero constant.

$$RT = RR * \sqrt{(NR/RR)} \qquad \text{Equation 3}$$

The number of processors NP 405 that are allocated based on the row target RT may be calculated using Equation 4, wherein PC is a processor capacity in rows/sec and k1 is a nonzero constant.

$$NP = RT/PC \qquad \text{Equation 4}$$

In an alternate embodiment, the plurality of processor computational resources 405 may be allocated using Equation 5, where NP is a number of processors 405 that are allocated and k2 is a nonzero constant.

$$NP = (NR/k2) * \sqrt{RR} \qquad \text{Equation 5}$$

The processors 405 may predict 729 a return on investment 249 for each consumer based on the current and previous lifetime value group correlation models and the current and previous cost per install group correlation models.

The embodiments reduce the computational costs of modeling the consumer activity and predicting the return on investment 249 by supporting the incremental recalculation of learning weight vectors as a function of previous learning weight vectors and current activity data 205. As a result, the consumer activity may be modeled and the return on investment may be predicted at a significantly lower computational cost.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   generating, by use of a plurality of processor computational resources, potential model types;
   dividing activity data into a training data set, a test data set, and a validation data set;
   training weights for the potential model types with the training set data;
   selecting a model type that minimizes a cost function wherein the weights are trained against the validation data set and the cost function is evaluated against the test data set;
   dividing the activity data into batches based on time interval;
   calculating a cost learning weight vector for predicting costs for a consumer application by a consumer as a function of consumer characteristics using the activity data, selected model type, and algorithmic parameters, wherein the learning weight vectors are calculated by minimizing the cost function J where $$J = \frac{1}{2} m \sum_{i=1}^{m} (h_i - y_i)^2 + DS \sum_{j=1}^{n} (\theta_j - \Theta_j)^2,$$

m is a number of activity data samples in a current batch, n is a number of features, $\theta_j$ is the learning weight vector, $\Theta_j$ is the previous learning weight vector, $h_i$ is a learning hypothesis for the learning weight vector, $y_i$ is an activity data instance, D is a constant, and S is a sampling ratio;
   calculating an income learning weight vector for predicting income for a consumer application from a consumer as a function of the consumer characteristics using the cost function J;
   generating a current lifetime value group correlation model for a plurality of consumers using the income learning weight vector and activity data in a current batch that has not been incorporated into the learning hypothesis for the income learning weight vector as inputs instead of the activity data from previous batches, wherein the current lifetime value group correlation model is used in place of activity data;
   generating a current cost per install group correlation model for installations of the consumer application for the plurality of consumers using the cost learning weight vector and activity data in the current batch that has not been incorporated into the learning hypothesis for the cost learning weight vector as inputs instead of the activity data from previous batches, wherein the current cost per install group correlation model is used in place of activity data;
   excluding mutually exclusive previous lifetime value group correlation models;
   subtracting a previous income learning weight vector from the lifetime value group correlation model to penalize divergent outputs from learned outputs;
   excluding mutually exclusive previous cost per install group correlation models;
   subtracting a previous cost learning weight vector from the cost per install group correlation model to penalize divergent outputs from the learned outputs;
   determining a row target of rows of the activity data processed per time interval as a function of a ratio of a number of unprocessed rows of the activity data and a rate of receiving the rows of the activity data per the time interval;
   allocating the plurality of processor computational resources to achieve the row target; and
   predicting a return on investment for each consumer based on the current and previous lifetime value group correlation models and the current and previous cost per install group correlation models.

2. The method of claim 1, wherein the potential model types are selected from the group consisting of a polynomial model, an exponential model, and a sigmoid model.

3. The method of claim 1, the method further comprising calculating the algorithmic parameters comprising a maximum polynomial degree and a step size.

4. The method of claim 1, wherein the income learning weight vector and the cost learning weight vector are calculated for a group of consumers.

5. The method of claim 1, wherein the consumer application is software.

6. The method of claim 1, the method further comprising generating a second lifetime value model for a second consumer application for the plurality of consumers using the income learning weight vector of the product and generating a second cost per install model for the second consumer application for the plurality of consumers using the cost learning weight of the product.

7. An apparatus comprising:
   a plurality of processor computational resources;
   a memory storing code executable by the plurality of processor computational resources to perform:

generating potential model types;
dividing activity data into a training data set, a test data set, and a validation data set;
training weights for the potential model types with the training set data;
selecting a model type that minimizes a cost function wherein the weights are trained against the validation data set and the cost function is evaluated against the test data set;
dividing the activity data into batches based on time interval;
calculating a cost learning weight vector for predicting costs for a consumer application by a consumer as a function of consumer characteristics using the activity data, selected model type, and the algorithmic parameters, wherein the learning weight vectors are calculated by minimizing the cost function J where $$J = \frac{1}{2}m\sum_{i=1}^{m}(h_i - y_i)^2 + DS\sum_{j=1}^{n}(\theta_j - \Theta_j)^2,$$

m is a number of activity data samples in a current batch, n is a number of features, $\theta_j$ is the learning weight vector, $\Theta_j$ is the previous learning weight vector, $h_i$ is a learning hypothesis for the learning weight vector, $y_i$ is an activity data instance, D is a constant, and S is a sampling ratio;
calculating an income learning weight vector for predicting income for a consumer application from a consumer as a function of the consumer characteristics using the cost function J;
generating a current lifetime value group correlation model for a plurality of consumers using the income learning weight vector and activity data in a current batch that has not been incorporated into the learning hypothesis for the income learning weight vector as inputs instead of the activity data from previous batches, wherein the current lifetime value group correlation model is used in place of activity data;
generating a current cost per install group correlation model for installations of the consumer application for the plurality of consumers using the cost learning weight vector and activity data in the current batch that has not been incorporated into the learning hypothesis for the cost learning weight vector as inputs instead of the activity data from previous batches, wherein the current cost per install group correlation model is used in place of activity data;
excluding mutually exclusive previous lifetime value group correlation models;
subtracting a previous income learning weight vector from the lifetime value group correlation model to penalize divergent outputs from learned outputs;
excluding mutually exclusive previous cost per install group correlation models;
subtracting a previous cost learning weight vector from the cost per install group correlation model to penalize divergent outputs from the learned outputs;
determining a row target of rows of the activity data processed per time interval as a function of a ratio of a number of unprocessed rows of the activity data and a rate of receiving the rows of the activity data per the time interval;
allocating the plurality of processor computational resources to achieve the row target; and predicting a return on investment for each consumer based on the current and previous lifetime value group correlation models and the current and previous cost per install group correlation models.

8. The apparatus of claim 7, wherein the potential model types are selected from the group consisting of a polynomial model, an exponential model, and a sigmoid model.

9. The apparatus of claim 7, the plurality of processor computational resources further calculating the algorithmic parameters comprising a maximum polynomial degree and a step size.

10. The apparatus of claim 7, wherein the income learning weight vector and the cost learning weight vector are calculated for a group of consumers.

11. The apparatus of claim 7, wherein the consumer application is software.

12. The apparatus of claim 7, the plurality of processor computational resources further generating a second lifetime value model for a second consumer application for the plurality of consumers using the income learning weight vector of the product and generating a second cost per install model for the second consumer application for the plurality of consumers using the cost learning weight of the product.

13. A program product comprising a non-transitory computer readable storage medium storing code executable by a plurality of processor computational resources to perform:
generating potential model types;
dividing activity data into a training data set, a test data set, and a validation data set;
training weights for the potential model types with the training set data;
selecting a model type that minimizes a cost function wherein the weights are trained against the validation data set and the cost function is evaluated against the test data set;
dividing the activity data into batches based on time interval;
calculating a cost learning weight vector for predicting costs for a consumer application by a consumer as a function of consumer characteristics using the activity data, selected model type, and algorithmic parameters, wherein the learning weight vectors are calculated by minimizing the cost function J where $$J = \frac{1}{2}m\sum_{i=1}^{m}(h_i - y_i)^2 + DS\sum_{j=1}^{n}(\theta_j - \Theta_j)^2,$$

m is a number of activity data samples in a current batch, n is a number of features, $\theta_j$ is the learning weight vector, $\Theta_j$ is the previous learning weight vector, $h_i$ is a learning hypothesis for the learning weight vector, $y_i$ is an activity data instance, D is a constant, and S is a sampling ratio;
calculating an income learning weight vector for predicting income for a consumer application from a consumer as a function of the consumer characteristics using the cost function J;
generating a current lifetime value group correlation model for a plurality of consumers using the income learning weight vector and activity data in a current batch that has not been incorporated into the learning hypothesis for the income learning weight vector as inputs instead of the activity data from previous batches, wherein the current lifetime value group correlation model is used in place of activity data;

generating a current cost per install group correlation model for installations of the consumer application for the plurality of consumers using the cost learning weight vector and activity data in the current batch that has not been incorporated into the learning hypothesis for the cost learning weight vector as inputs instead of the activity data from previous batches, wherein the current cost per install group correlation model is used in place of activity data;

excluding mutually exclusive previous lifetime value group correlation models;

subtracting a previous income learning weight vector from the lifetime value group correlation model to penalize divergent outputs from learned outputs;

excluding mutually exclusive previous cost per install group correlation models;

subtracting a previous cost learning weight vector from the cost per install group correlation model to penalize divergent outputs from the learned outputs;

determining a row target of rows of the activity data processed per time interval as a function of a ratio of a number of unprocessed rows of the activity data and a rate of receiving the rows of the activity data per the time interval;

allocating the plurality of processor computational resources to achieve the row target; and predicting a return on investment for each consumer based on the current and previous lifetime value group correlation models and the current and previous cost per install group correlation models.

14. The program product of claim 13, wherein the potential model types are selected from the group consisting of a polynomial model, an exponential model, and a sigmoid model.

15. The program product of claim 13, the plurality of processor computational resources further calculating the algorithmic parameters comprising a maximum polynomial degree and a step size.

16. The program product of claim 13, wherein the income learning weight vector and the cost learning weight vector are calculated for a group of consumers.

17. The program product of claim 13, wherein the consumer application is software.

18. The method of claim 1, wherein the row target RT is calculated as $RT=RR*\sqrt{(NR/RR)}$, NR is the number of unprocessed rows of the activity data, RR is a number of rows of the activity data received per the time interval, and k is a nonzero constant.

19. The apparatus of claim 7, wherein the row target RT is calculated as $RT=RR*\sqrt{(NR/RR)}$, NR is the number of unprocessed rows of the activity data, RR is a number of rows of the activity data received per the time interval, and k is a nonzero constant.

20. The program product of claim 13, wherein the row target RT is calculated as $RT=RR*\sqrt{(NR/RR)}$, NR is the number of unprocessed rows of the activity data, RR is a number of rows of the activity data received per the time interval, and k is a nonzero constant.

* * * * *